US008883953B2

(12) United States Patent
Sohn et al.

(10) Patent No.: US 8,883,953 B2
(45) Date of Patent: Nov. 11, 2014

(54) COPOLYMER, ARTICLE INCLUDING SAME, AND DISPLAY DEVICE INCLUDING THE ARTICLE

(71) Applicant: Samsung Electronics Co., Ltd., Suwon-si (KR)

(72) Inventors: Byung Hee Sohn, Yongin-si (KR); Hyun Jeong Jeon, Seoul (KR); Sang Soo Lee, Seongnam-si (KR); Jae Jun Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/749,281

(22) Filed: Jan. 24, 2013

(65) Prior Publication Data

US 2013/0302586 A1 Nov. 14, 2013

(30) Foreign Application Priority Data

May 9, 2012 (KR) ........................ 10-2012-0049313

(51) Int. Cl.
*C08G 63/00* (2006.01)

(52) U.S. Cl.
CPC ............ *G08G 69/00* (2013.01); *G08G 73/1071* (2013.01); *G08G 73/1075* (2013.01); *G08G 73/1046* (2013.01); *G08G 73/1078* (2013.01); *G08G 73/1042* (2013.01); *G08G 73/105* (2013.01)
USPC ............................ 528/190; 524/599; 428/395

(58) Field of Classification Search
CPC ........................................................ C08G 73/10
USPC ............................ 528/190; 524/599; 428/395
See application file for complete search history.

(56) References Cited

U.S. PATENT DOCUMENTS 4,931,540 A 6/1990 Mueller et al.
2011/0059305 A1 * 3/2011 Kaneya et al. ................ 428/220

OTHER PUBLICATIONS

Chern et al. Macromolecules, vol. 30, No. 16, 1997.*
Watanabe, Y. et al., New Negative-Type Photosensitive Alkaline-developable Semi-aromatic Polymides with Low Dielectric Constants Based on Poly(amic acid) from Aromatic Diamine Containing Adamantyl Units and Alicyclic Dianhydrides, a Cross-linker, and a Photoacid Generator, Polymer Journal, 2005, vol. 37: 270-276.

* cited by examiner

*Primary Examiner* — Shane Fang

(74) *Attorney, Agent, or Firm* — Cantor Colburn LLP

(57) ABSTRACT

A copolymer that includes a repeating unit A having a repeating unit represented by Chemical Formula 1, a repeating unit represented by Chemical Formula 2, or a combination thereof; and a repeating unit B having a repeating unit represented by Chemical Formula 3, a repeating unit represented by Chemical Formula 4, or a combination thereof, an article including the same, and a display device including the article.

Chemical Formula 1

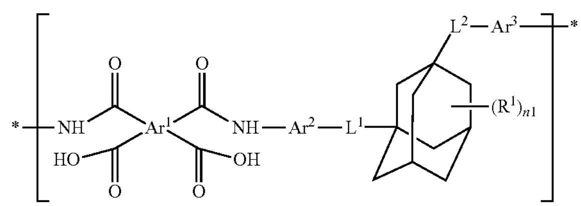

Chemical Formula 2

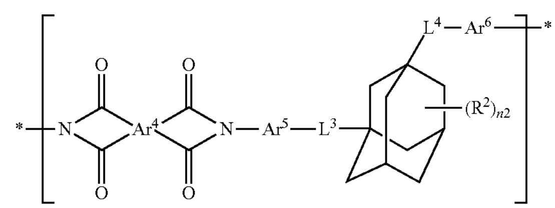

Chemical Formula 3

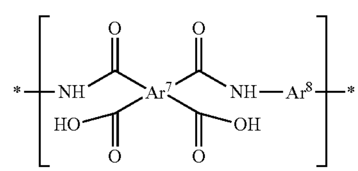

Chemical Formula 4

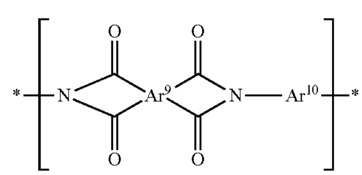

19 Claims, 1 Drawing Sheet

COPOLYMER, ARTICLE INCLUDING SAME, AND DISPLAY DEVICE INCLUDING THE ARTICLE

CROSS-REFERENCE TO RELATED APPLICATION

This application claims priority to and the benefit of Korean Patent Application No. 10-2012-0049313 filed on May 9, 2012, and all the benefits accruing therefrom under 35 U.S.C. §119, the content of which is incorporated herein in its entirety by reference.

BACKGROUND

1. Field

A copolymer, an article including the same, and a display device including the article are disclosed.

2. Description of the Related Art

A colorless transparent material has been sought after for diverse purposes such as for an optical lens, a functional optical film, and a disk substrate. As information devices are becoming smaller and display devices become capable of providing higher resolution, more functions and greater performance are required from the material.

Therefore, it would be desirable to develop a colorless material having excellent transparency, heat resistance, mechanical strength, and flexibility.

SUMMARY

An embodiment provides a copolymer having improved transparency, heat resistance, mechanical strength, and flexibility.

Another embodiment provides an article including the copolymer.

Yet another embodiment provides a display device including the article.

According to an embodiment, provided is a copolymer that includes a repeating unit A including a repeating unit represented by Chemical Formula 1, a repeating unit represented by Chemical Formula 2, or a combination thereof; and a repeating unit B including a repeating unit represented by Chemical Formula 3, a repeating unit represented by Chemical Formula 4, or a combination thereof.

Chemical Formula 1

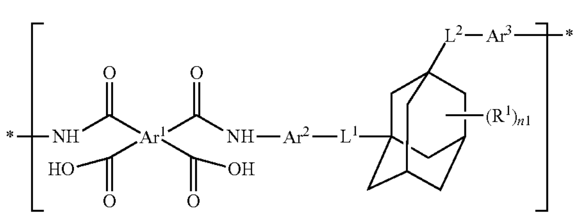

Chemical Formula 2

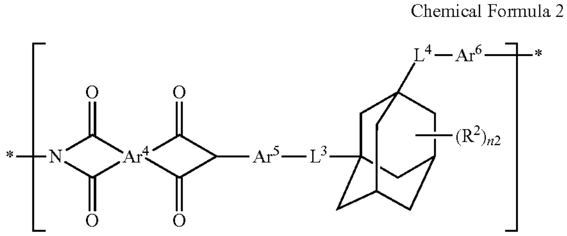

In Chemical Formulae 1 and 2, $Ar^1$ and $Ar^4$ are the same or different in each repeating unit and are each independently a substituted or unsubstituted tetravalent C3 to C30 alicyclic organic group, a substituted or unsubstituted tetravalent C6 to C30 aromatic organic group, or a substituted or unsubstituted tetravalent C2 to C30 heterocyclic group, wherein the alicyclic organic group, the aromatic organic group, or the heterocyclic group is present singularly; two or more groups are linked to each other to provide a condensed ring system; or two or more groups are linked to each other through a single bond, —O—, —S—, —C(=O)—, —CH(OH)—, —S(=O)$_2$—, —Si(CH$_3$)$_2$—, —(CH$_2$)$_p$— (wherein $1 \le p \le 10$), —(CF$_2$)$_q$— (wherein $1 \le q \le 10$), —C(CH$_3$)$_2$—, —C(CF$_3$)$_2$—, or —C(=O)NH—, $Ar^2$, $Ar^3$, $Ar^5$, and $Ar^6$ are the same or different in each repeating unit and are each independently a substituted or unsubstituted divalent C6 to C30 aromatic organic group, wherein the aromatic organic group is present singularly; two or more aromatic groups are linked to each other to provide a condensed ring system; or two or more aromatic groups are linked to each other through a single bond, —O—, —S—, —C(=O)—, —CH(OH)—, —S(=O)$_2$—, —Si(CH$_3$)$_2$—, —(CH$_2$)$_p$— (wherein $1 \le p \le 10$), —(CF$_2$)$_q$— (wherein $1 \le q \le 10$), —C(CH$_3$)$_2$—, —C(CF$_3$)$_2$—, or —C(=O)NH—, $L^1$, $L^2$, $L^3$, and $L^4$ are the same or different in each repeating unit and are each independently —O—, —C(=O)—, —C(=O)O—, —CH$_2$O—, or —Si($R^{200}R^{201}$)O— wherein $R^{200}$ and $R^{201}$ are each independently a C1 to C10 alkyl group, a C1 to C10 alkoxy group, a C6 to C12 aryl group, or a C6 to C12 aryloxy group, $R^1$ and $R^2$ are the same or different in each repeating unit and are each independently a C1 to C5 aliphatic organic group, and n1 and n2 are the same or different in each repeating unit and are each independently integers ranging from 0 to 14.

Chemical Formula 3

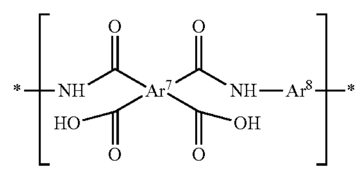

Chemical Formula 4

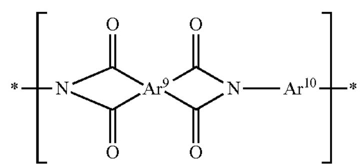

In Chemical Formulae 3 and 4, $Ar^7$ and $Ar^9$ are the same or different in each repeating unit and are each independently a substituted or unsubstituted tetravalent C3 to C30 alicyclic organic group, a substituted or unsubstituted tetravalent C6 to C30 aromatic organic group, or a substituted or unsubstituted tetravalent C2 to C30 heterocyclic group, wherein the alicyclic organic group, the aromatic organic group, or the heterocyclic group is present singularly; two or more groups are linked to each other to provide a condensed ring system; or two or more groups are linked to each other through a single bond, —O—, —S—, —C(=O)—, —CH(OH)—, —S(=O)$_2$—, —Si(CH$_3$)$_2$—, —(CH$_2$)$_p$— (wherein 10), —(CF$_2$)$_q$— (wherein $1 \le p \le 10$), —(CF$_2$)$_q$— (wherein $1 \le q \le 10$), —C(CH$_3$)$_2$—, —C(CF$_3$)$_2$—, or —C(=O)NH—, and $Ar^8$ and $Ar^{10}$ are the same or different in each repeating unit and are each independently a substituted or unsubstituted divalent C6 to C30 aromatic organic group, a substituted or unsubstituted divalent C3 to C30 alicyclic organic group, or a substituted or unsubstituted divalent fluorenyl group, wherein the aromatic organic group or the alicyclic organic group is present singularly; two or more groups are linked to each other to provide a condensed ring system; or two or more groups are linked to each other through a single bond, —O—, —S—, —C(═O)—, —CH(OH)—, —S(═O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(═O)NH—.

In an embodiment, Ar$^1$, Ar$^4$, Ar$^7$, and Ar$^9$ are the same or different in each repeating unit and are each independently selected from the following Chemical Formulae,

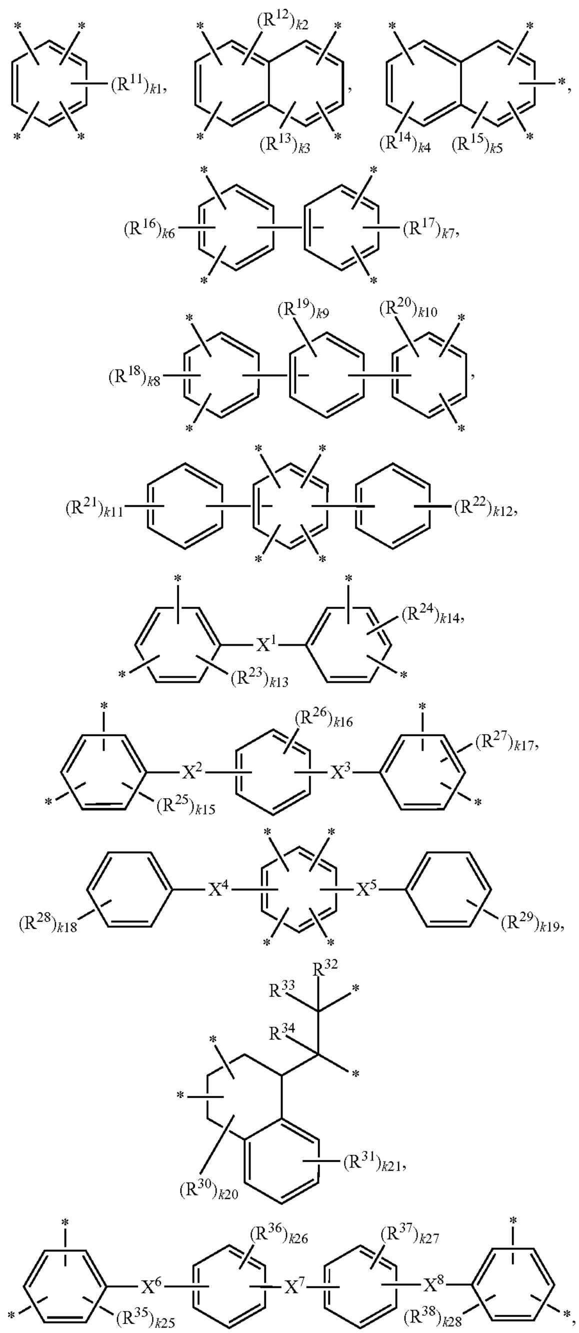

-continued

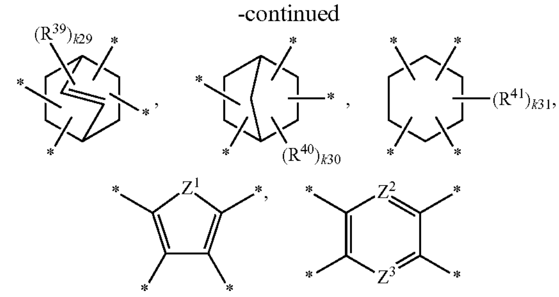

wherein, in the above Chemical Formulae,

X$^1$ to X$^8$ are the same or different and are independently a single bond, —O—, —S—, —C(═O)—, —CH(OH)—, —S(═O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(═O)NH—, Z$^1$ is —O—, —S—, or —NR$^{300}$—, wherein R$^{300}$ is hydrogen or a C1 to C5 alkyl group, Z$^2$ and Z$^3$ are the same or different and are each independently —N═ or —C(R$^{301}$)═ (wherein R$^{301}$ is hydrogen or a C1 to C5 alkyl group), provided that Z$^2$ and Z$^3$ are not simultaneously CR$^{301}$, R$^{11}$ to R$^{31}$ and R$^{35}$ to R$^{41}$ are the same or different and are each independently halogen, a substituted or unsubstituted C1 to C10 aliphatic organic group, or a substituted or unsubstituted C6 to C20 aromatic organic group, R$^{32}$ to R$^{34}$ are the same or different and are each independently hydrogen, halogen, a substituted or unsubstituted C1 to C10 aliphatic organic group, or a substituted or unsubstituted C6 to C20 aromatic organic group, k1, k2, and k3 are each independently integers ranging from 0 to 2, k4, k6, k7, k8, k10, k13, k14, k15, k17, k25, and k28 are each independently integers ranging from 0 to 3 k5 is an integer of 0 or 1, k9, k16, k21, k26, and k27 are each independently integers ranging from 0 to 4, k11, k12, k18, k19, and k20 are each independently integers ranging from 0 to 5, and k29, k30, and k31 are each independently integers ranging from 0 to 8.

In another embodiment, Ar$^1$, Ar$^4$, Ar$^7$, and Ar$^9$ are the same or different in each repeating unit and are each independently selected from the following Chemical Formulae.

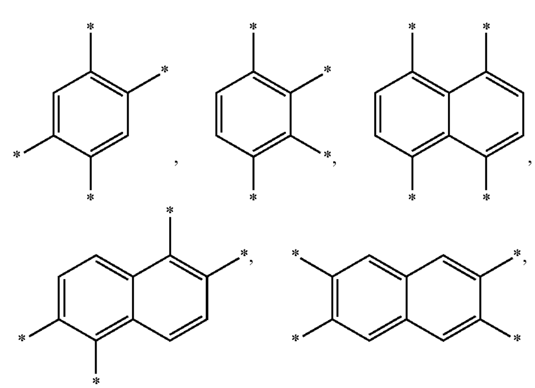

-continued
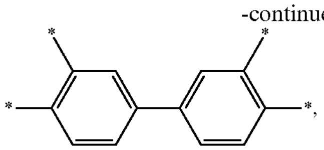
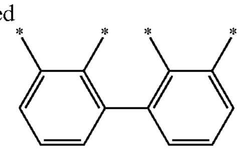
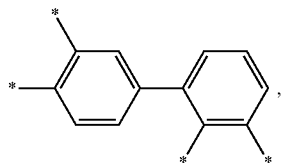
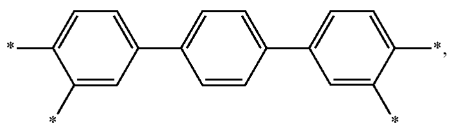
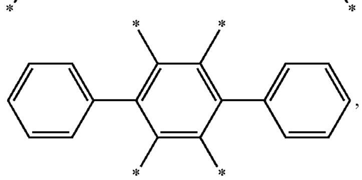
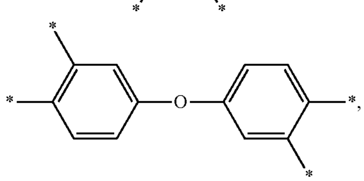
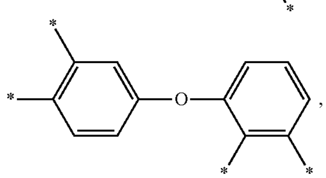
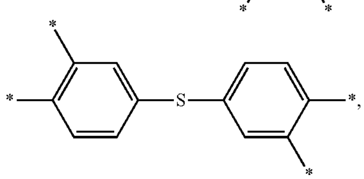
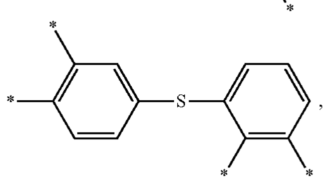
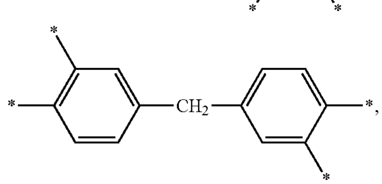
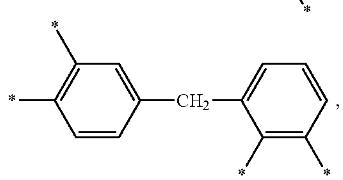
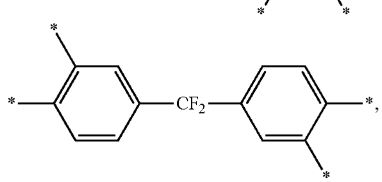
-continued
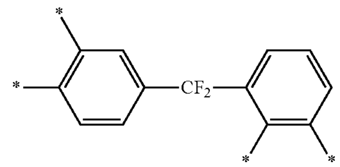
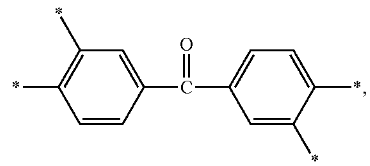
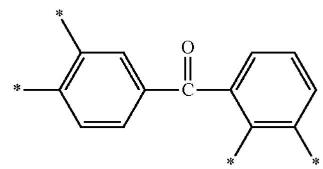
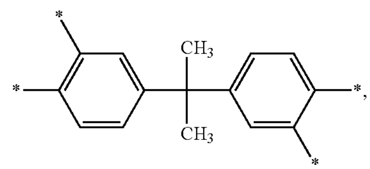
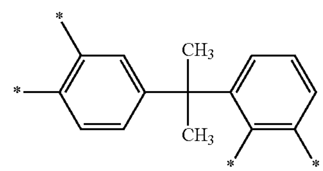
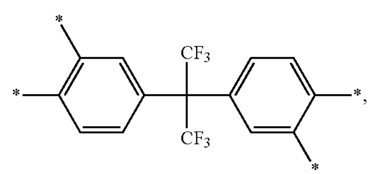
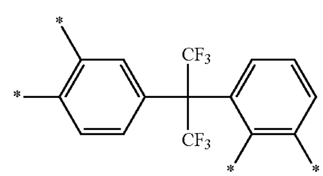
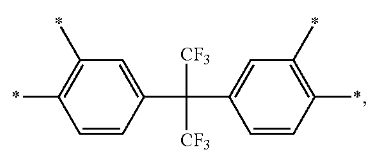
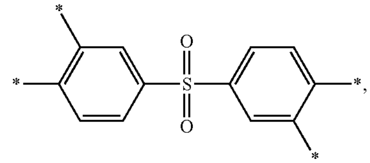
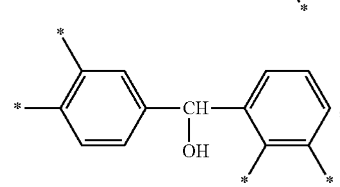

-continued

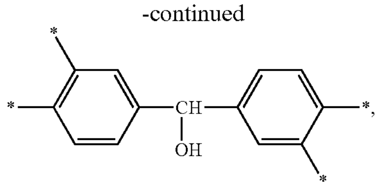
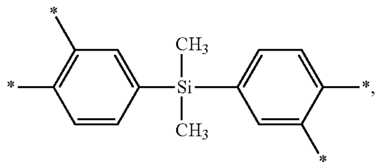
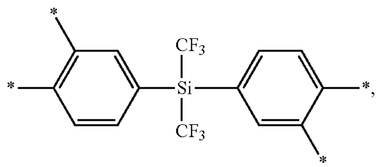
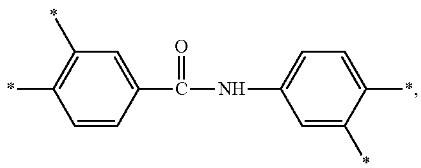
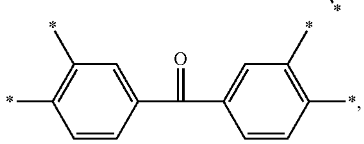
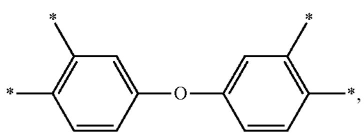
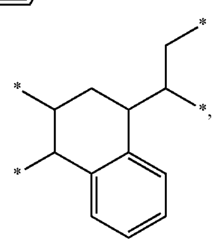
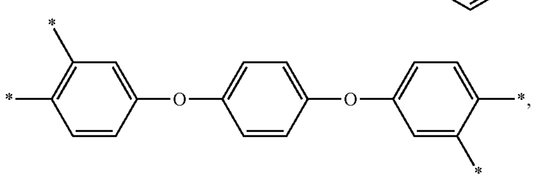
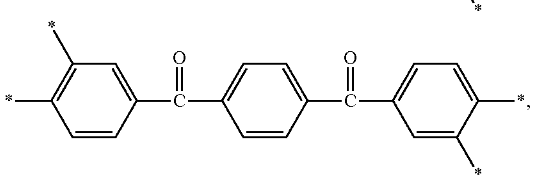
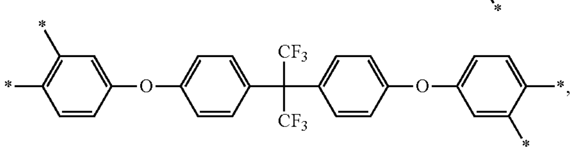
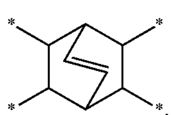
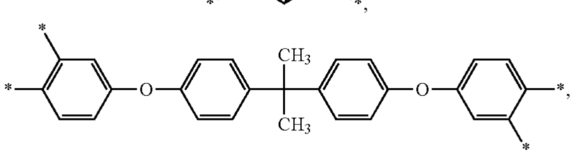

-continued

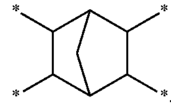
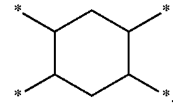
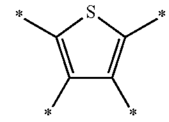
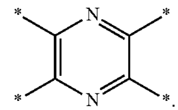

In an embodiment, $Ar^2$, $Ar^3$, $Ar^5$, and $Ar^6$ are the same or different in each repeating unit and are each independently selected from the following Chemical Formulae.

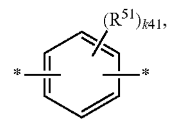
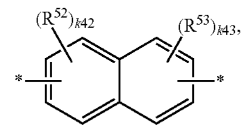
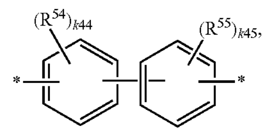
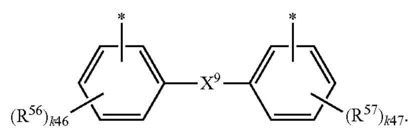

In the above Chemical Formulae, $X^9$ is —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $R^{51}$ to $R^{57}$ are the same or different and are each independently halogen, a substituted or unsubstituted C1 to C10 aliphatic organic group, or a substituted or unsubstituted C6 to C20 aromatic organic group, k41, k44, k45, k46, and k47 are each independently integers ranging from 0 to 4, and k42, and k43 are each independently integers ranging from 0 to 3.

In another embodiment, $Ar^2$, $Ar^3$, $Ar^5$, and $Ar^6$ are the same or different in each repeating unit and are each independently selected from the following Chemical Formulae.

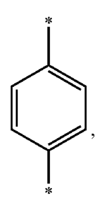
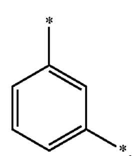
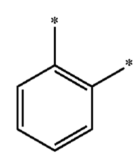
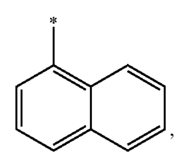

-continued
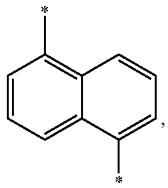
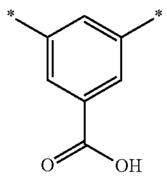
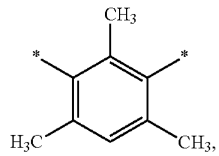
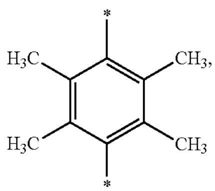
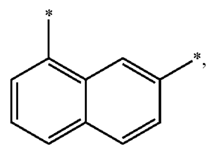
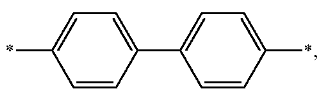
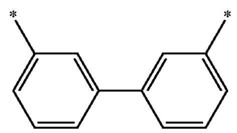
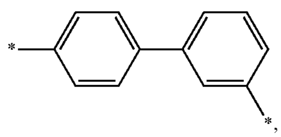
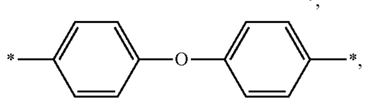
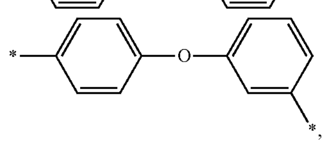
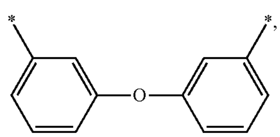
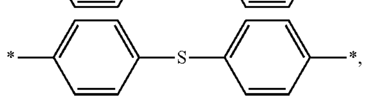
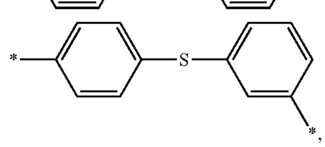
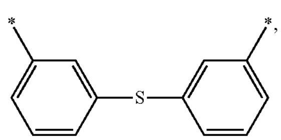
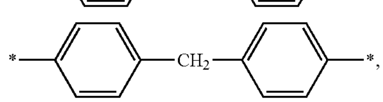
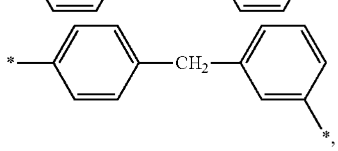
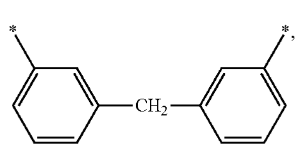
-continued
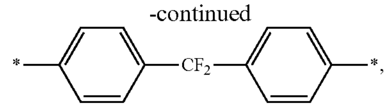
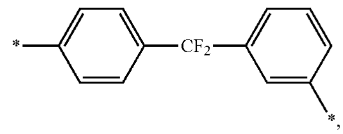
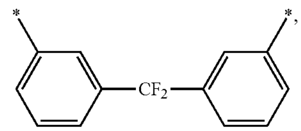
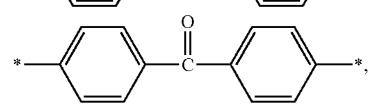
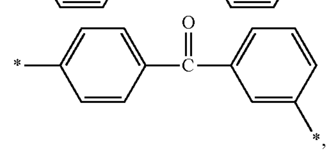
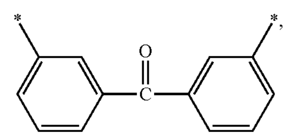
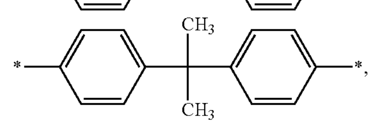
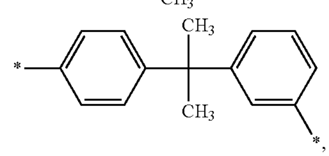
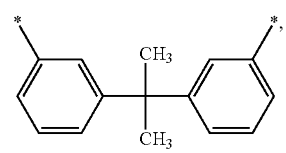
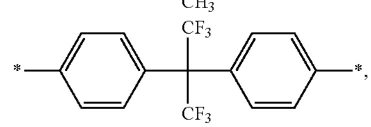
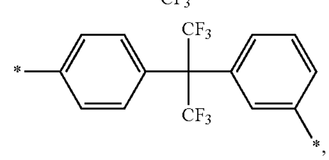
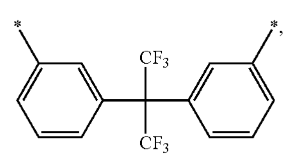
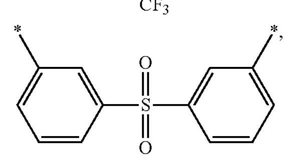
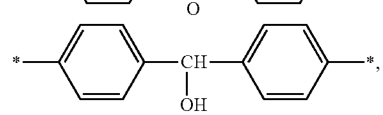

-continued

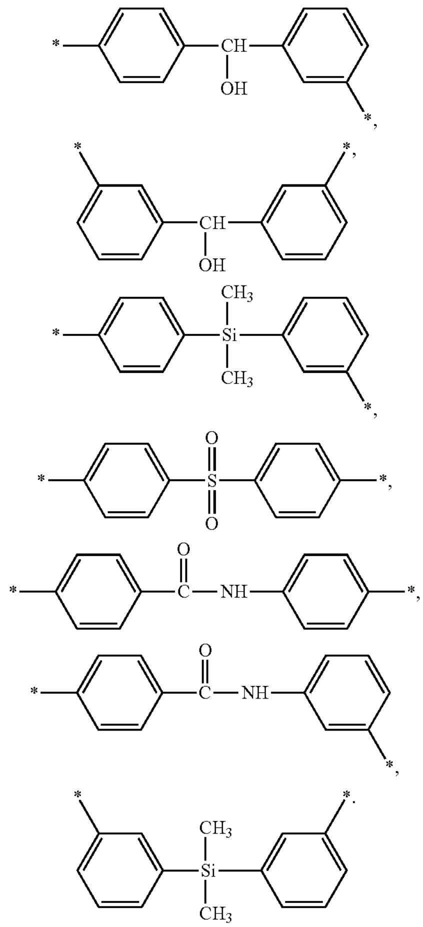

-continued

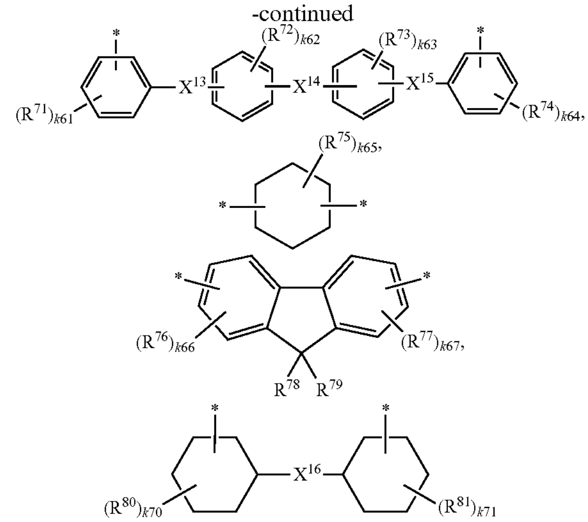

In the above Chemical Formulae, $X^{10}$ to $X^{15}$ are the same or different and are each independently a single bond, —O—, —S—, —C(═O)—, —CH(OH)—, —S(═O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(═O)NH—, $R^{61}$ to $R^{81}$ are the same or different and are each independently halogen, a substituted or unsubstituted C1 to C10 aliphatic organic group, or a substituted or unsubstituted C6 to C20 aromatic organic group, k51, k54, k55, k56, k57, k58, k59, k60, k61, k62, k63, and k64 are each independently integers ranging from 0 to 4, k52, k53, k66, and k67 are each independently integers ranging from 0 to 3, and k65, k70, and k71 are integers ranging from 0 to 10.

In an embodiment, $Ar^8$ and $Ar^{10}$ are the same or different in each repeating unit and are each independently selected from the following Chemical Formulae.

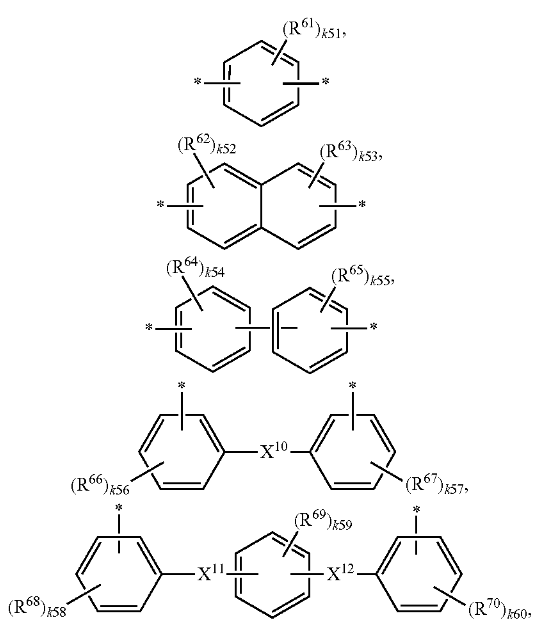

In another embodiment, $Ar^8$ and $Ar^{10}$ are the same or different in each repeating unit and are each independently selected from the following Chemical Formulae:

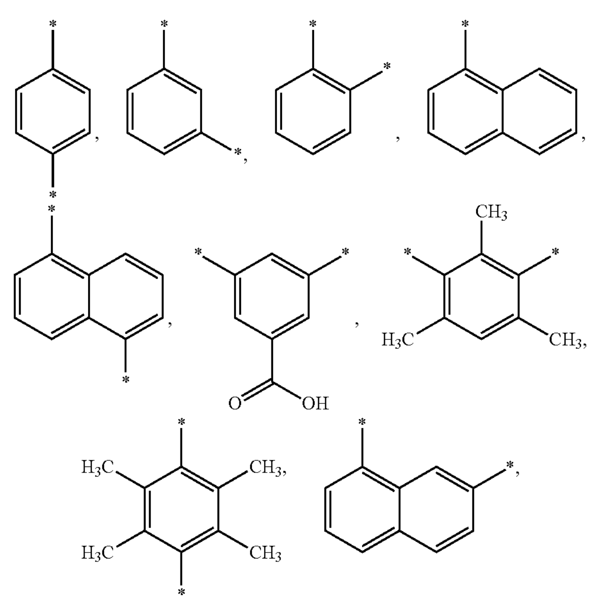

-continued
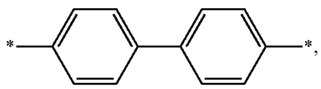
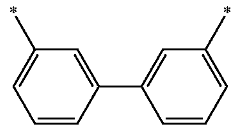
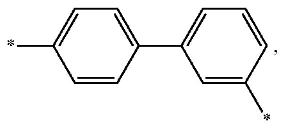
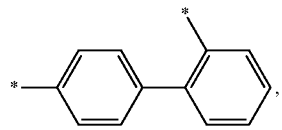
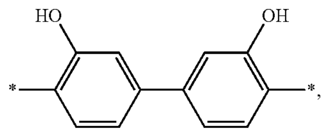
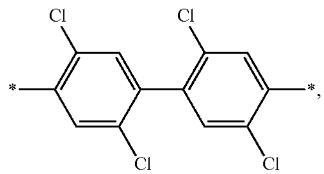
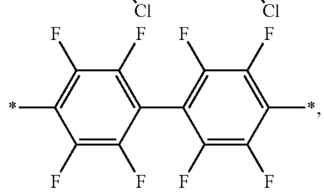
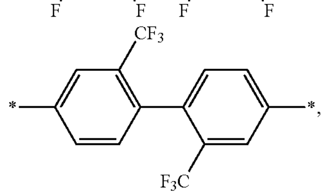
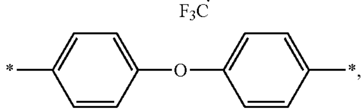
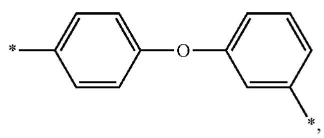
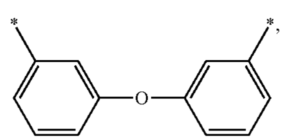
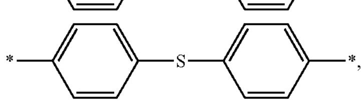
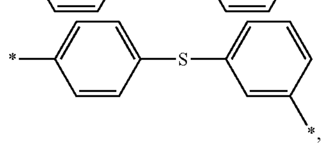
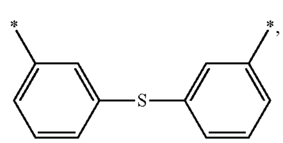
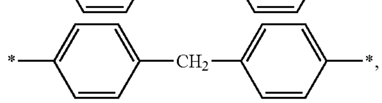
-continued
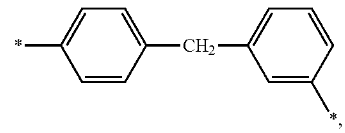
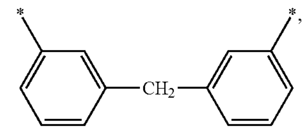
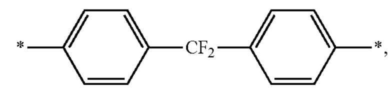
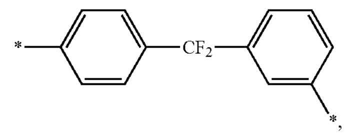
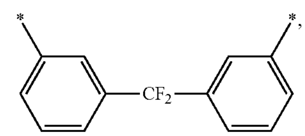
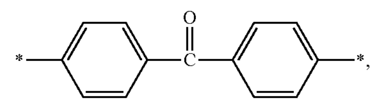
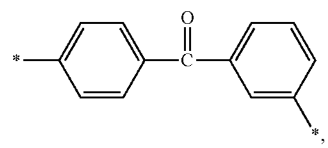
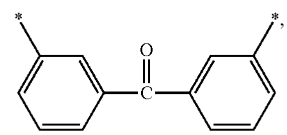
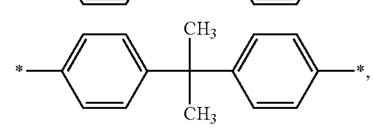
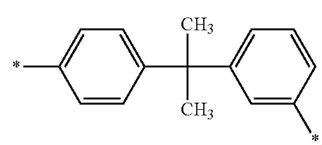
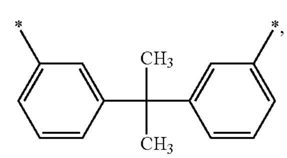
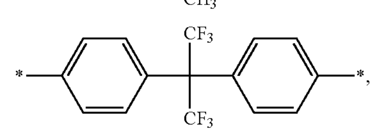
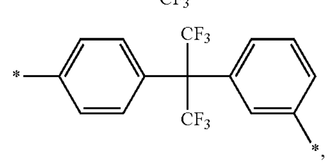

-continued
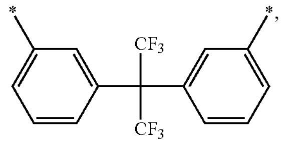
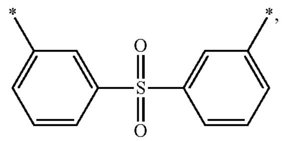
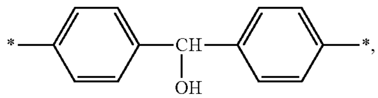
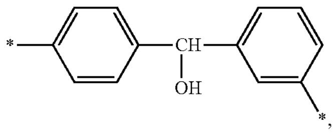
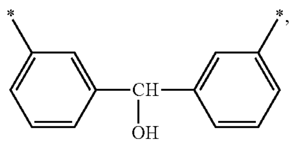
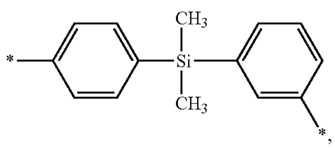
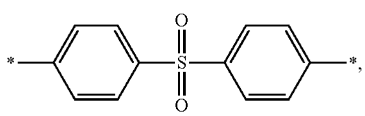
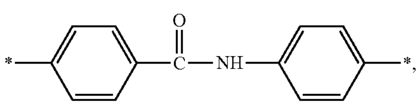
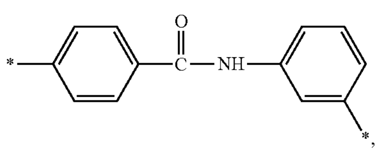
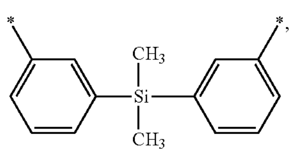
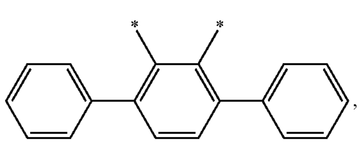
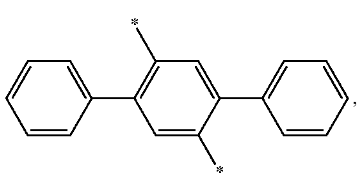
-continued
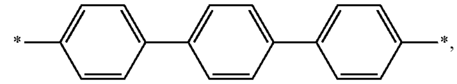
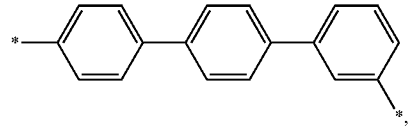
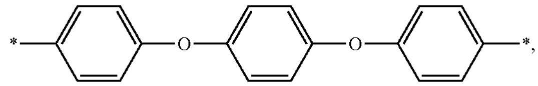
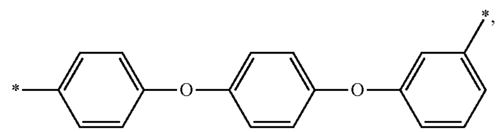
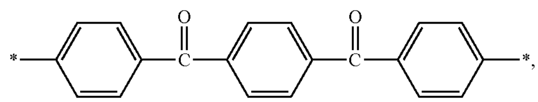
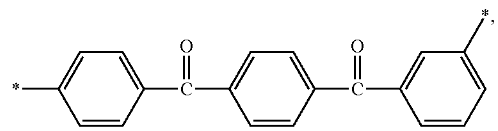
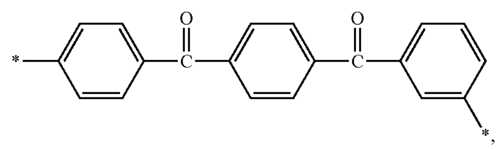
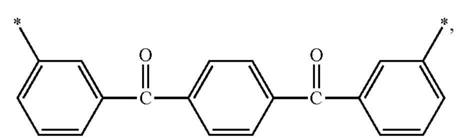
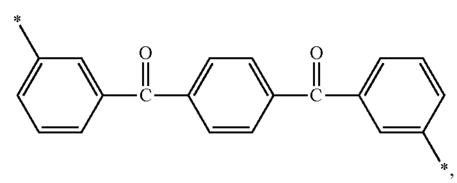
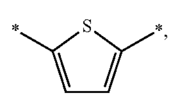
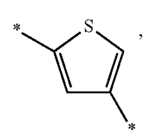
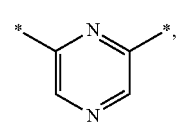
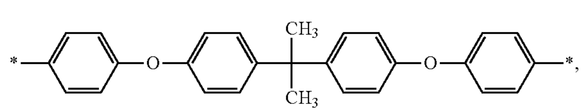
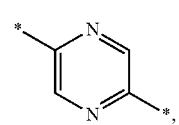
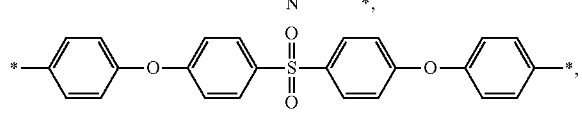

-continued

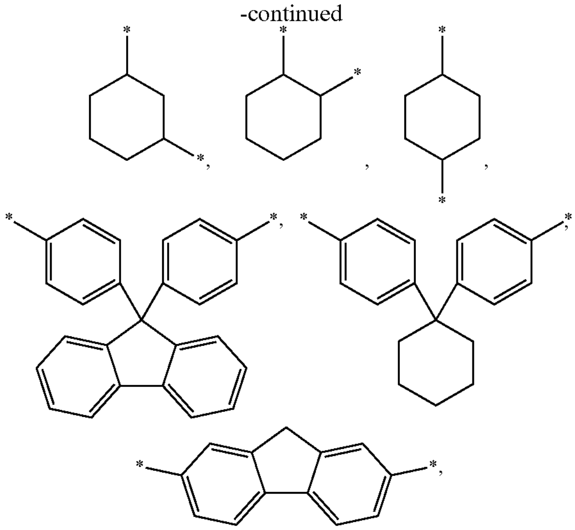

-continued

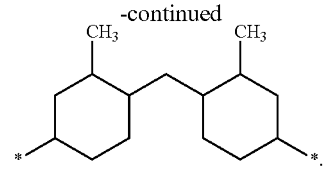

In an embodiment, the repeating unit represented by the above Chemical Formula 1 may include a repeating unit represented by the following Chemical Formulae 1-1 to 1-5, or a combination thereof; the repeating unit represented by the above Chemical Formula 2 may include a repeating unit represented by the following Chemical Formulae 2-1 to 2-5, or a combination thereof; the repeating unit represented by Chemical Formula 3 may include a repeating unit represented by the following Chemical Formulae 3-1 to 3-5, or a combination thereof; and the repeating unit represented by the above Chemical Formula 4 may include a repeating unit represented by the following Chemical Formulae 4-1 to 4-5, or a combination thereof.

Chemical Formula 1-1

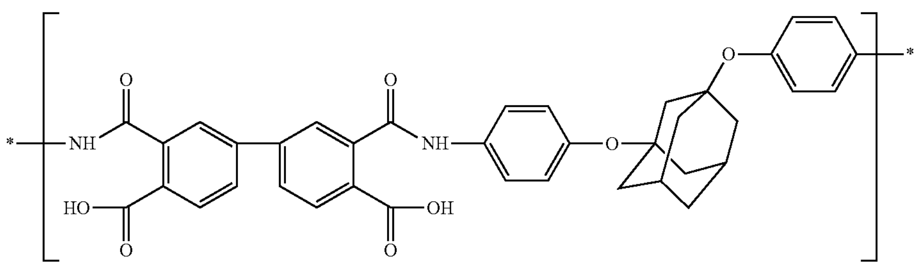

Chemical Formula 1-2

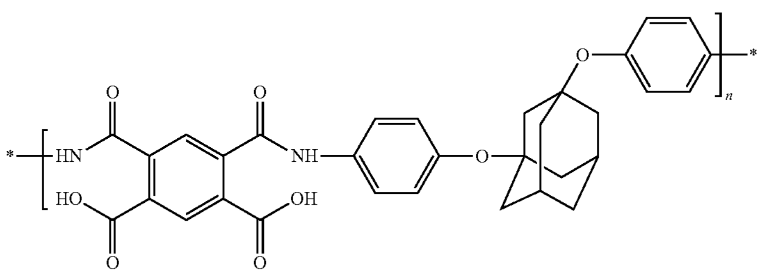

Chemical Formula 1-3

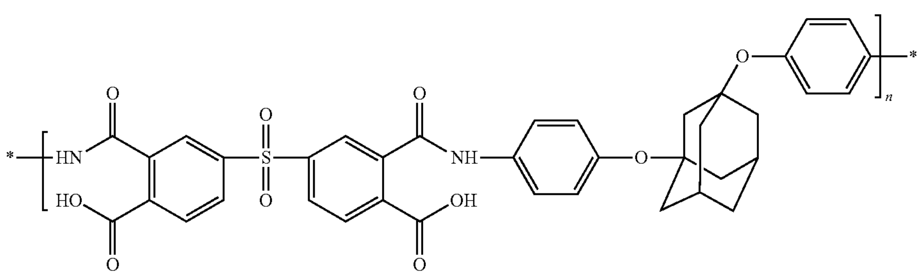

Chemical Formula 1-4

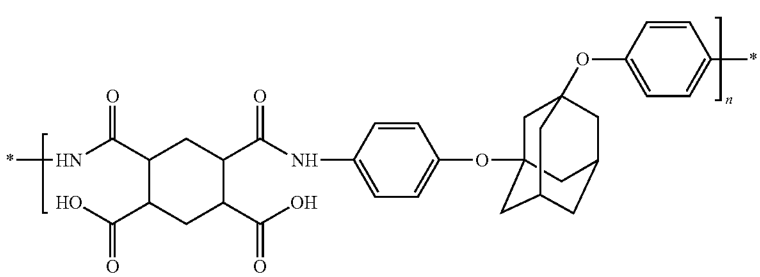

-continued
Chemical Formula 1-5
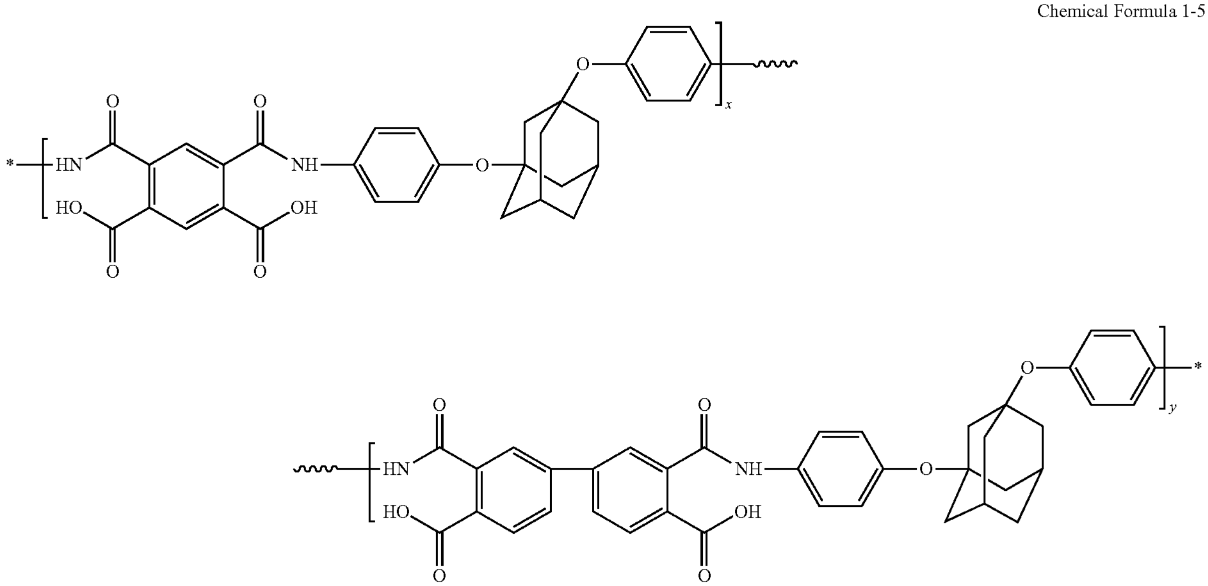
Chemical Formula 2-1
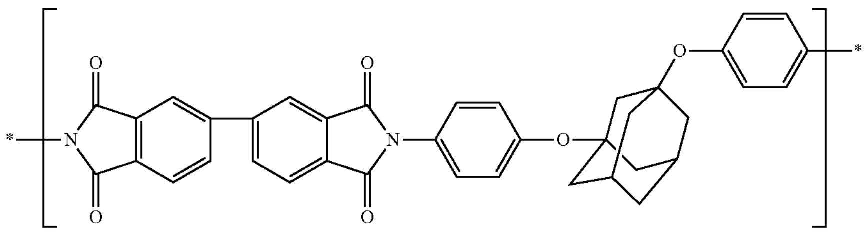
Chemical Formula 2-2
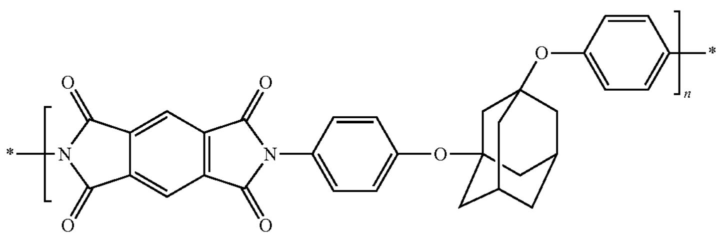
Chemical Formula 2-3
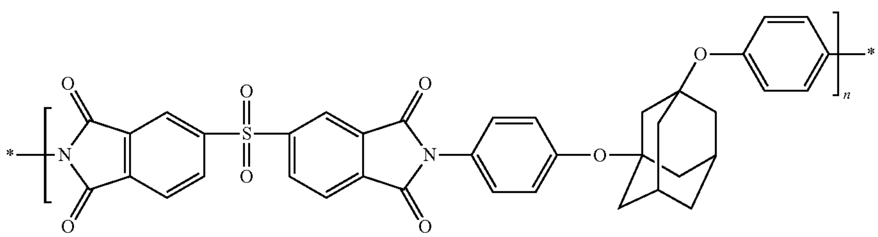
Chemical Formula 2-4
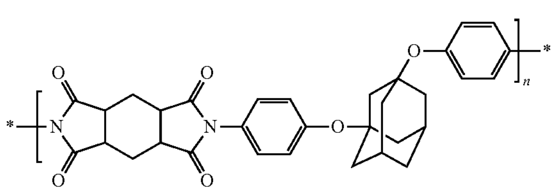
Chemical Formula 3-1
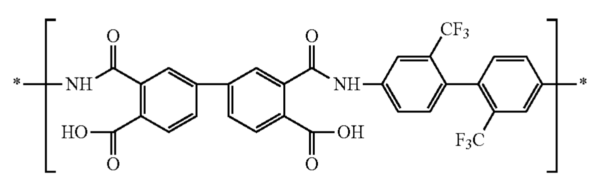

-continued
Chemical Formula 3-2
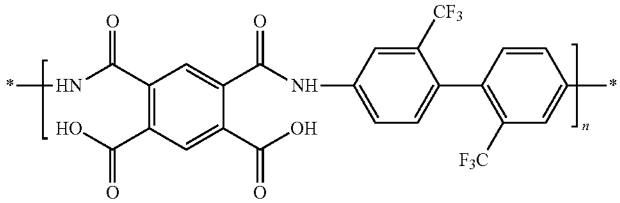
Chemical Formula 3-3
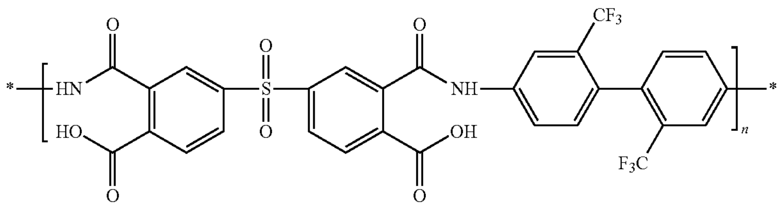
Chemical Formula 3-4
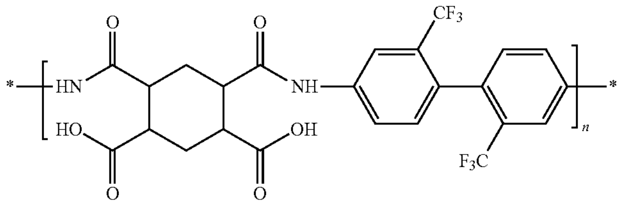
Chemical Formula 3-5
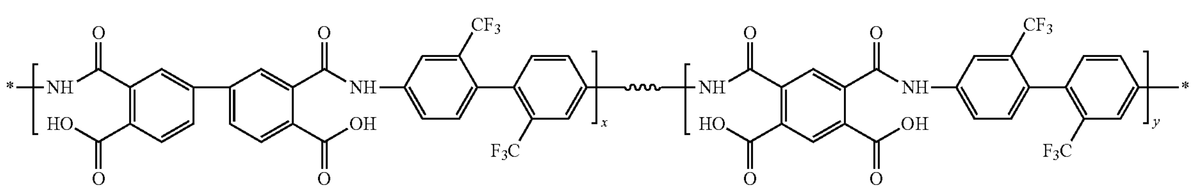
Chemical Formula 4-1
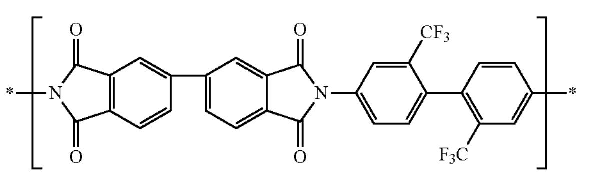
Chemical Formula 4-2
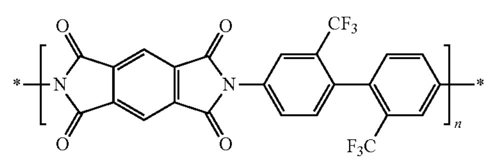
Chemical Formula 4-3
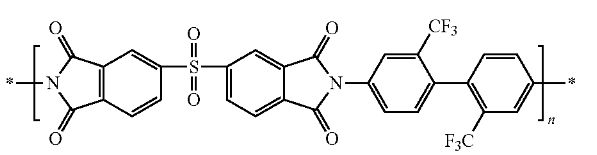
Chemical Formula 4-4
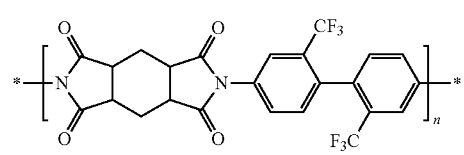
Chemical Formula 4-5
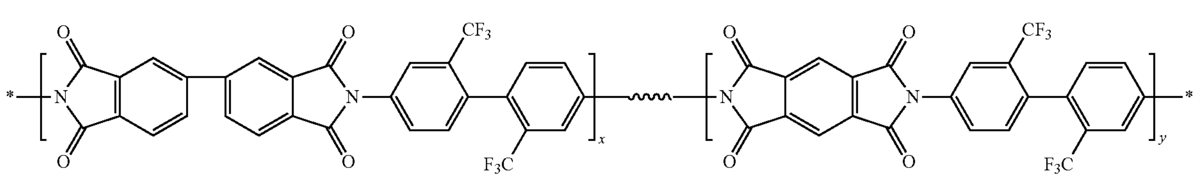

The copolymer may have a weight average molecular weight ("Mw") of about 1,000 gram per mole ("g/mol") to about 500,000 g/mol.

In the copolymer, the repeating unit A may include the repeating unit represented by Chemical Formula 1 and the repeating unit represented by the above Chemical Formula 2 in a mole ratio of about 0.01:99.99 to about 99.99:0.01, and the repeating unit B may include the repeating unit represented by the above Chemical Formula 3 and the repeating unit represented by the above Chemical Formula 4 in a mole ratio of about 0.01:99.99 to about 99.99:0.01.

The copolymer may include the repeating unit A and the repeating unit B in a mole ratio of about 0.60:0.40 to about 0.40:0.60.

The copolymer may be cross-linked.

According to another embodiment, an article including the copolymer is provided.

The article may be a film, a fiber, or a coating material.

The article may have a thickness of about 0.1 micrometers ("μm") to about 200 μm.

The article may have an average transmittance of greater than or equal to about 80% in a wavelength range of about 380 nanometers ("nm") to about 800 nm.

The article may have a yellow index ("YI") of less than or equal to about 5, a coefficient of thermal expansion of less than or equal to about 50 parts per million ("ppm/° C."), and a weight loss ratio of less than or equal to about 1% at about 400° C.

According to yet another embodiment, a display device including the article is provided.

DETAILED DESCRIPTION

Figure 1:
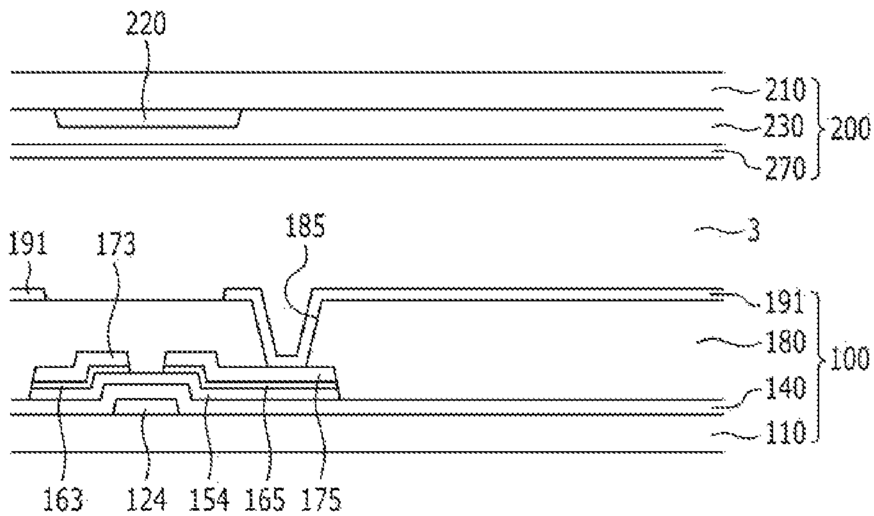
FIG. 1 is a cross-sectional view of a liquid crystal display ("LCD") according to an embodiment.

This disclosure will be described more fully hereinafter with reference to the accompanying drawings, in which embodiments are shown. This disclosure may, however, be embodied in many different forms and is not to be construed as limited to the exemplary embodiments set forth herein. Accordingly, the embodiments are merely described below, by referring to the figures, to explain aspects of the present description. These embodiments are provided so that this disclosure will be thorough and complete, and will fully convey the scope of the claims to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a specific definition is not otherwise provided, the term "substituted" refers to one substituted with at least one substituent including a halogen (—F, —Br, —Cl, or —I), a hydroxyl group (—OH), a nitro group (—$NO_2$), a cyano group (—CN), an amino group ($NH_2$, $NH(R^{100})$, or $N(R^{100})$, or $N(R^{101})(R^{102})$, wherein $R^{100}$, $R^{101}$, and $R^{102}$ are the same or different, and are each independently a C1 to C10 alkyl group), an amidino group (—C(═NH)N($R^{103}$)($R^{104}$), wherein $R^{103}$ and $R^{104}$ are the same or different, and are each independently hydrogen or a C1 to C10 alkyl group, a hydrazine group (—N($R^{105}$)—N($R^{106}$)($R^{107}$), wherein $R^{105}$, $R^{106}$, and $R^{107}$ are the same or different, and are each independently hydrogen or a C1 to C10 alkyl group, a hydrazone group (═N—N($R^{108}$)($R^{109}$), wherein $R^{108}$ and $R^{109}$ are the same or different, and are each independently hydrogen or a C1 to C10 alkyl group), a carboxyl group (—C(═O)OH), an ester group (—C(═O)O($R^{110}$), wherein $R^{110}$ is a C1 to C10 alkyl group), a ketone group (—C(═O)—), a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

"Alkyl" as used herein means a straight or branched chain saturated aliphatic hydrocarbon having the specified number of carbon atoms, for example methyl, ethyl, propyl, and butyl groups.

"Cycloalkyl" as used herein means a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclooctenyl) or cycloalkynyl (e.g., cyclooctynyl) groups. Cycloalkyl groups do not include an aromatic ring or a heterocyclic ring. When the numbers of carbon atoms is specified (e.g., C3-C15 cycloalkyl), the number means the number of ring members present in the one or more rings.

"Heterocyclic" as used herein means a cycloalkyl group wherein the cycloalkyl group includes at least one heteroatom (e.g., 1, 2, or 3 heteroatom(s)), wherein the heteroatom(s) is each independently N, O, S, Si, or P.

"Alkenyl" as used herein means a straight or branched chain, monovalent hydrocarbon group having at least one carbon-carbon double bond (e.g., ethenyl (—HC═$CH_2$)).

"Alkynyl" as used herein means a straight or branched chain, monovalent hydrocarbon group having at least one carbon-carbon triple bond (e.g., ethynyl).

"Alkoxy" as used herein means an alkyl group that is linked via an oxygen (i.e., alkyl-O—), for example methoxy, ethoxy, and sec-butyloxy groups.

"Aryl" as used herein means a cyclic moiety in which all ring members are carbon and at least one ring is aromatic. More than one ring may be present, and any additional rings may be independently aromatic, saturated or partially unsaturated, and may be fused, pendant, spirocyclic or a combination thereof.

"Heteroaryl" as used herein means a monovalent carbocyclic ring group that includes one or more aromatic rings, in which at least one ring member (e.g., one, two or three ring members) is a heteroatom (e.g., nitrogen (N), oxygen (O), phosphorus (P), silicon (Si), and sulfur (S)). Multiple rings, if present, may be pendent, spiro or fused.

"Alkylene" as used herein means a straight or branched chain, saturated, divalent aliphatic hydrocarbon group, (e.g., methylene (—$CH_2$—) or, propylene (—$(CH_2)_3$—)).

"Alkynylene" as used herein means a straight or branched chain divalent aliphatic hydrocarbon that has one or more unsaturated carbon-carbon bonds, at least one of which is a triple bond (e.g., ethynylene).

"Cycloalkylene" as used herein means a divalent group that comprises one or more saturated and/or partially saturated rings in which all ring members are carbon, such as cyclopropylene, cyclobutylene, cyclopentylene, cyclohexylene, cycloheptylene, cyclooctylene, adamantylene and partially saturated variants of the foregoing, such as cycloalkenylene groups (e.g., cyclooctenylene) or cycloalkynylene (e.g., cyclooctynylene) groups.

"Arylene" as used herein means a divalent group formed by the removal of two hydrogen atoms from one or more rings of an arene, wherein the hydrogen atoms may be removed from the same or different rings (e.g., phenylene or napthylene).

As used herein, when a specific definition is not otherwise provided, the term "alkyl group" may refer to a C1 to C30 alkyl group, and specifically a C1 to C15 alkyl group, the term "cycloalkyl group" may refer to a C3 to C30 cycloalkyl group, and specifically a C3 to C18 cycloalkyl group, the term "alkoxy group" may refer to a C1 to C30 alkoxy group, and specifically a C1 to C18 alkoxy group, the term "ester group" may refer to a C2 to C30 ester group, and specifically a C2 to C18 ester group, the term "ketone group" may refer to a C2 to C30 ketone group, and specifically a C2 to C18 ketone group, the term "aryl group" may refer to a C6 to C30 aryl group, and specifically a C6 to C18 aryl group, the term "alkenyl group" may refer to a C2 to C30 alkenyl group, and specifically a C2 to C18 alkenyl group, the term "alkylene group" may refer to a C1 to C30 alkylene group, and specifically a C1 to C18 alkylene group, and the term "arylene group" may refer to a C6 to C30 arylene group, and specifically a C6 to C16 arylene group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group, the term "aromatic organic group" refers to a C6 to C30 aryl group or a C6 to C30 arylene group, specifically a C6 to C16 aryl group or a C6 to C16 arylene group, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, specifically a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

The term "copolymerization" may refer to block copolymerization, random copolymerization, or graft copolymerization, and the term "copolymer" may refer to a block copolymer, a random copolymer, or a graft copolymer.

In addition, in the specification, the mark "*" may refer to a point of attachment of a given fragment or a repeating unit to another fragment or a repeating.

According to an embodiment, a copolymer includes a repeating unit A including a repeating unit represented by Chemical Formula 1, a repeating unit represented by the following Chemical Formula 2, or a combination thereof; and a repeating unit B including a repeating unit represented by Chemical Formula 3, a repeating unit represented by the following Chemical Formula 4, or a combination thereof.

In an embodiment, the copolymer may be a random copolymer, but is not limited thereto.

Chemical Formula 1

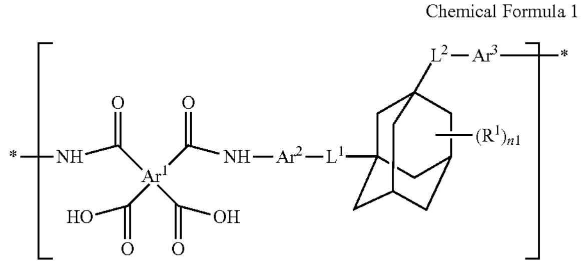

Chemical Formula 2

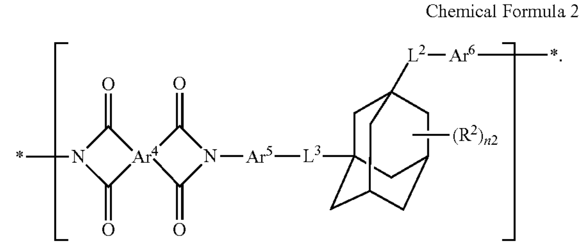

In Chemical Formulae 1 and 2, $Ar^1$ and $Ar^4$ are the same or different in each repeating unit and are each independently a substituted or unsubstituted tetravalent C3 to C30 alicyclic organic group, a substituted or unsubstituted tetravalent C6 to C30 aromatic organic group, or a substituted or unsubstituted tetravalent C2 to C30 heterocyclic group, wherein the alicyclic organic group, the aromatic organic group, or the heterocyclic group is present singularly; two or more groups are linked to each other to provide a condensed ring system; or two or more groups are linked to each other through a single bond, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(═O)NH—.

In an embodiment, Ar$^1$ and Ar$^4$ are the same or different in each repeating unit and are each independently substituted or unsubstituted tetravalent C3 to C20 alicyclic organic group, a substituted or unsubstituted tetravalent C6 to C20 aromatic organic group, or a substituted or unsubstituted tetravalent C2 to C20 heterocyclic group, and in another embodiment a substituted or unsubstituted tetravalent C3 to C15 alicyclic organic group, a substituted or unsubstituted tetravalent C6 to C15 aromatic organic group, or a substituted or unsubstituted tetravalent C2 to C15 heterocyclic group.

Ar$^2$, Ar$^3$, Ar$^5$ and Ar$^6$ are the same or different in each repeating unit and are each independently a substituted or unsubstituted divalent C6 to C30 aromatic organic group, wherein the aromatic organic group is present singularly; two or more aromatic groups are linked to each other to provide a condensed ring system; two or more aromatic groups are linked to each other through a single bond, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(═O)NH—.

In an embodiment, Ar$^2$, Ar$^3$, Ar$^5$, and Ar$^6$ are the same or different in each repeating unit and are each independently a substituted or unsubstituted divalent C6 to C20 aromatic organic group, and in another embodiment a substituted or unsubstituted divalent C6 to 010 aromatic organic group.

L$^1$, L$^2$, L$^3$, and L$^4$ are the same or different in each repeating unit and are each independently —O—, —C(═O)—, —C(═O)O—, —CH$_2$O—, —Si(R$^{200}$R$^{201}$)O— wherein R$^{200}$ and R$^{201}$ are each independently a C1 to C10 alkyl group, a C1 to C10 alkoxy group, a C6 to C12 aryl group, or a C6 to C12 aryloxy group, specifically a methyl group, or L$^1$, L$^2$, L$^3$, and L$^4$ are specifically —O—.

R$^1$ and R$^2$ are the same or different in each repeating unit and are each independently a C1 to C5 aliphatic organic group, specifically a C1 to C3 aliphatic organic group.

n1 and n2 are the same or different in each repeating unit and are each independently integers ranging from 0 to 14, specifically 0 to 5, more specifically 0 to 3, and even more specifically each is 0.

The repeating unit A includes an adamantyl group which may decrease an intramolecular charge transfer ("CT") complex in a molecule and decrease formation of the intramolecular CT complex between the molecules. In turn, this may lead to improved transparency, anisotropic morphology due to low degree of molecule orientation and thus, low birefringence, as well as improved heat resistance compared to a non-aromatic structure.

Chemical Formula 3

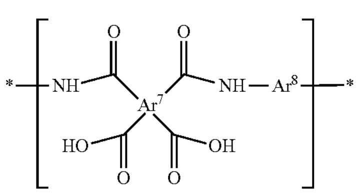

-continued

[Chemical Formula 4]

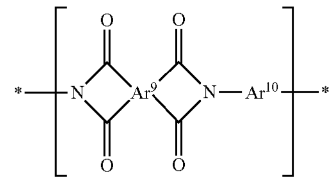

In Chemical Formulae 3 and 4,

Ar$^7$ and Ar$^9$ are the same or different in each repeating unit and are each independently a substituted or unsubstituted tetravalent C3 to C30 alicyclic organic group, a substituted or unsubstituted tetravalent C6 to C30 aromatic organic group, or a substituted or unsubstituted tetravalent C2 to C30 heterocyclic group, wherein the alicyclic organic group, the aromatic organic group, or the heterocyclic group is present singularly; two or more groups are linked to each other to provide a condensed ring system; or two or more groups are linked to each other through a single bond, —O—, —S—, —C(═O)—, —CH(OH)—, —S(═O)$_2$—, —Si(CH$_3$)$_2$—, —(CH$_2$)$_p$— (wherein 10), —(CF$_2$)$_q$— (wherein 1≤q≤10), —C(CH$_3$)$_2$—, —C(CF$_3$)$_2$—, or —C(═O)NH—.

In an embodiment, Ar$^7$ and Ar$^9$ are the same or different in each repeating unit and are each independently substituted or unsubstituted tetravalent C3 to C20 alicyclic organic group, a substituted or unsubstituted tetravalent C6 to C20 aromatic organic group, or a substituted or unsubstituted tetravalent C2 to C20 heterocyclic group, and in another embodiment, a substituted or unsubstituted tetravalent C3 to C15 alicyclic organic group, a substituted or unsubstituted tetravalent C6 to C15 aromatic organic group, or a substituted or unsubstituted tetravalent C2 to C15 heterocyclic group.

Ar$^8$ and Ar$^{10}$ are the same or different in each repeating unit and are each independently a substituted or unsubstituted divalent C6 to C30 aromatic organic group, a substituted or unsubstituted divalent C3 to C30 alicyclic organic group, or a substituted or unsubstituted divalent fluorenyl group, wherein the aromatic organic group or the alicyclic organic group is present singularly; two or more groups are linked to each other to provide a condensed ring system; or two or more groups are linked to each other through a single bond, a single bond, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(═O)NH—.

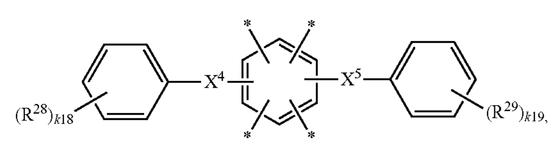

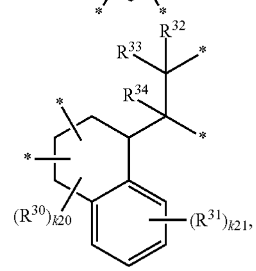

-continued

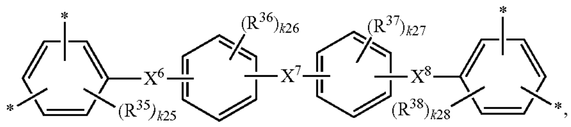

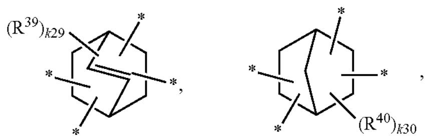

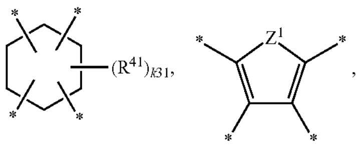

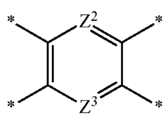

In an embodiment, $Ar^8$ and $Ar^{10}$ are the same or different in each repeating unit and are each independently a substituted or unsubstituted divalent C6 to C20 aromatic organic group, a substituted or unsubstituted divalent C3 to C20 alicyclic organic group, or substituted or unsubstituted divalent a fluorenyl group, and in another embodiment a substituted or unsubstituted divalent C6 to C15 aromatic organic group, a substituted or unsubstituted divalent C3 to C15 alicyclic organic group, or a substituted or unsubstituted divalent fluorenyl group.

The repeating unit B may offer improved optical properties of a polymer because of a non-aromatic adamantine fragment introduced thereinto. Such properties may be deteriorated when an aromatic group is present in the repeating unit.

In an embodiment, $Ar^1$, $Ar^4$, $Ar^7$, and $Ar^9$ in Chemical Formulae 1 to 4 are the same or different in each repeating unit and are each independently selected from the following Chemical Formulae, but are not limited thereto,

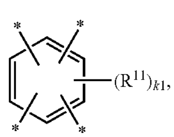

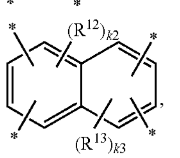

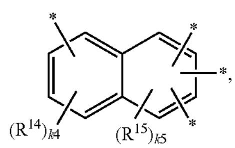

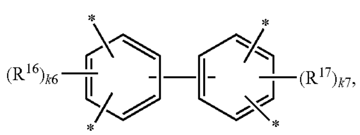

-continued

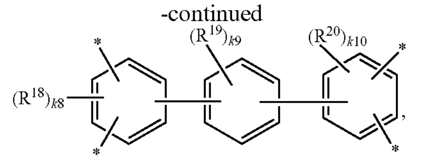

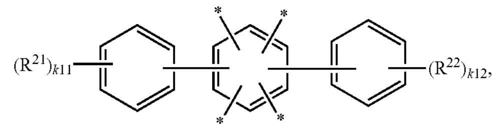

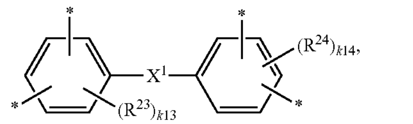

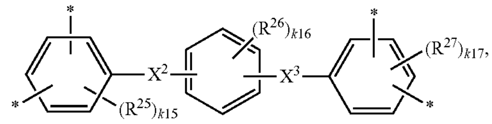

wherein in the above Chemical Formulae, $X^1$ to $X^8$ are the same or different and are independently a single bond, —O—, —S—, —C(=O)—, —CH(OH)—, —S(=O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(=O)NH—, $Z^1$ is —O—, —S—, or —NR$^{300}$—, wherein $R^{300}$ is hydrogen or a C1 to C5 alkyl group, $Z^2$ and $Z^3$ are the same or different and are each independently —N= or —C(R$^{301}$)= (wherein $R^{301}$ is hydrogen or a C1 to C5 alkyl group), provided that $Z^2$ and $Z^3$ are not simultaneously $CR^{301}$, $R^{11}$ to $R^{31}$ and $R^{35}$ to $R^{41}$ are the same or different and are each independently halogen, a substituted or unsubstituted C1 to C10 aliphatic organic group, or a substituted or unsubstituted C6 to C20 aromatic organic group, $R^{32}$ to $R^{34}$ are the same or different and are each independently hydrogen, halogen, a substituted or unsubstituted C1 to C10 aliphatic organic group, or a substituted or unsubstituted C6 to C20 aromatic organic group, k1, k2, and k3 are each independently integers ranging from 0 to 2, k4, k6, k7, k8, k10, k13, k14, k15, k17, k25, and k28 are each independently integers ranging from 0 to 3, k5 is an integer of 0 or 1, k9, k16, k21, k26, and k27 are each independently integers ranging from 0 to 4, k11, k12, k18, k19, and k20 are each independently integers ranging from 0 to 5, and k29, k30, and k31 are each independently integers ranging from 0 to 8.

In an embodiment, $Ar^1$, $Ar^4$, $Ar^7$, and $Ar^9$ in Chemical Formulae 1 to 4 are the same or different in each repeating unit and are each independently selected from the following Chemical Formulae, but is not limited thereto.

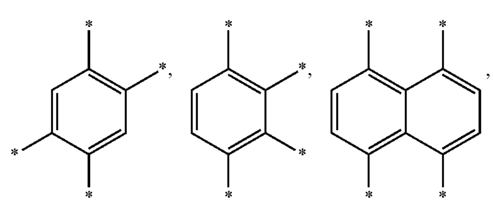

-continued
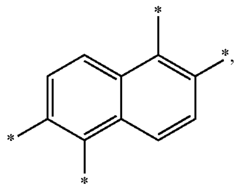
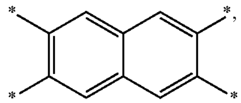
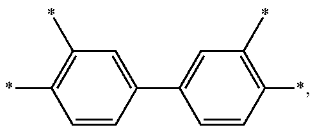
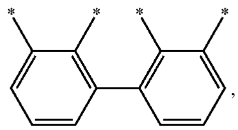
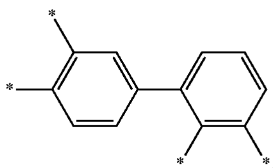
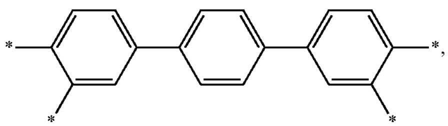
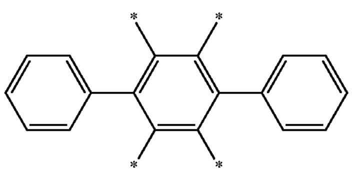
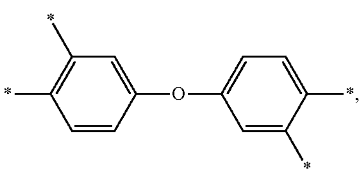
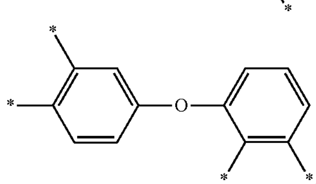
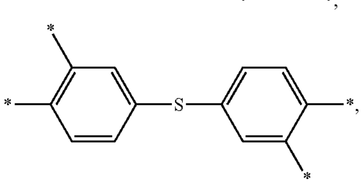
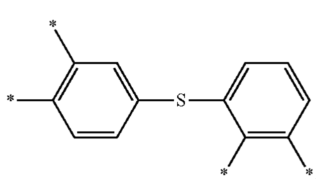
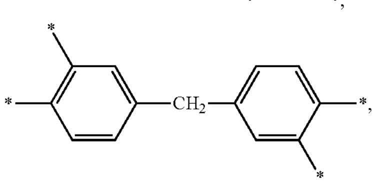
-continued
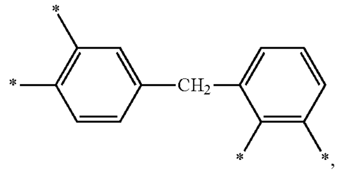
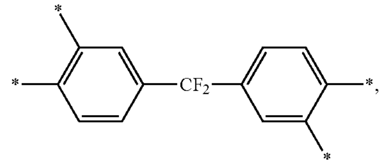
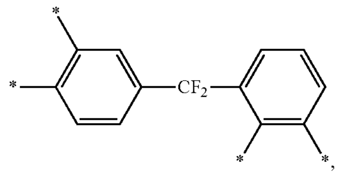
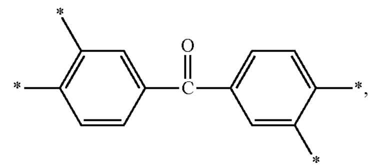
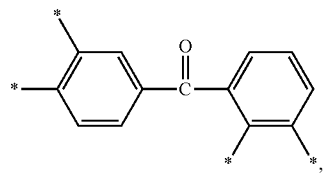
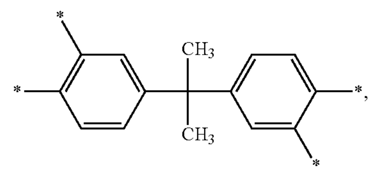
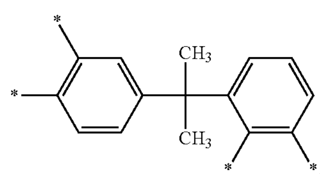
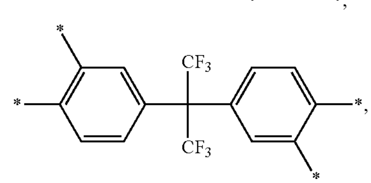
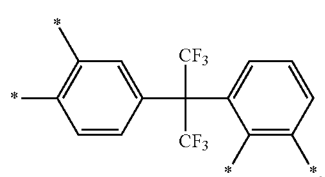
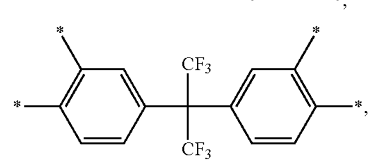

-continued

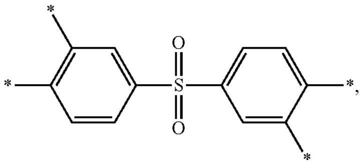

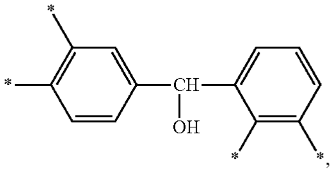

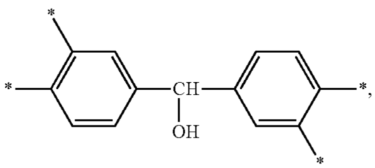

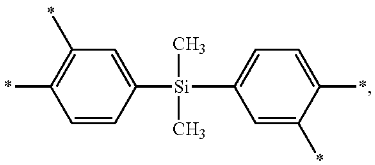

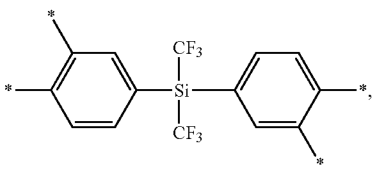

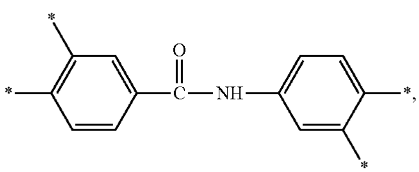

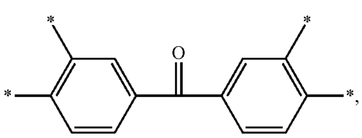

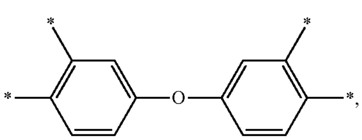

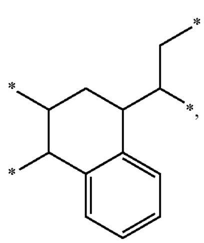

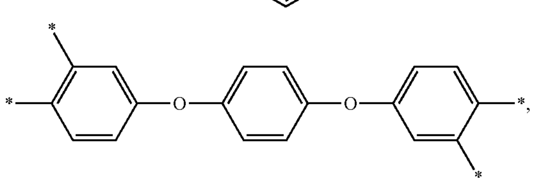

-continued

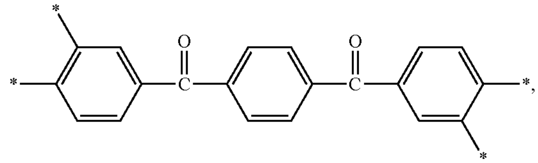

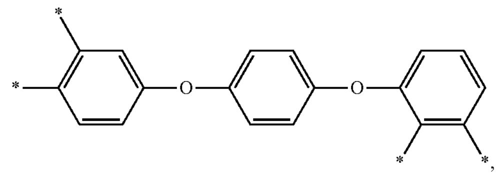

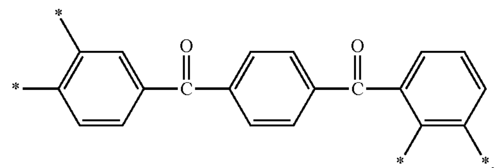

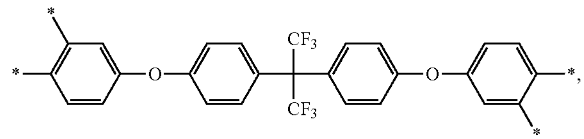

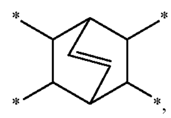

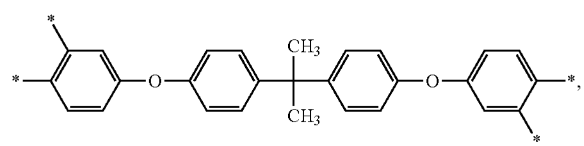

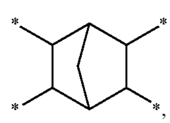

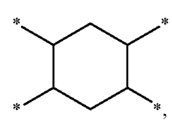

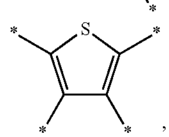

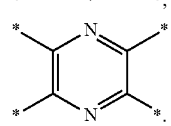

In the above Chemical Formulae 1 to 4, $Ar^1$, $Ar^4$, $Ar^7$, and $Ar^9$ may be a residual group of dianhydride.

The dianhydride may be selected from 3,3',4,4'-biphenyltetracarboxylic dianhydride ("BPDA"), 2,2-bis-(3,4-dicarboxyphenyl)hexafluoropropane dianhydride ("6FDA"), benzophenone tetracarboxylic dianhydride ("BTDA"), bis(3,4-dicarboxylphenyl)sulfone dianhydride ("DSDA"), 4,4'-(4,4'-isopropylidenediphenoxy)bis(phthalic anhydride ("BPADA"), 4,4'-oxydiphthalic anhydride ("ODPA"), (4-(2,5-dioxotetrafuran-3-yl)-1,2,3,4-tetrahydronaphthalene-1,2-dicarboxylic anhydride ("DTDA") and a combination thereof, but is not limited thereto.

In Chemical Formulae 1 and 2, $Ar^2$, $Ar^3$, $Ar^5$, and $Ar^6$ may be the same or different in each repeating unit and are each independently selected from the following Chemical Formulae, but is not limited thereto.

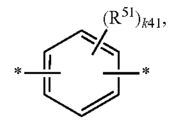

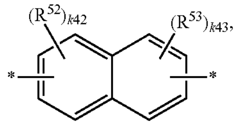

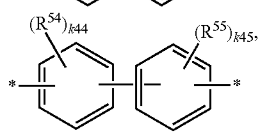

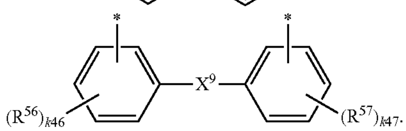

In the above Chemical Formula, $X^9$ is —O—, —S—, —C(=O)—, —CH(OH)—, —S(=O)$_2$—, —Si(CH$_3$)$_2$—, —(CH$_2$)$_p$— (wherein $1 \le p \le 10$), —(CF$_2$)$_q$— (wherein $1 \le q \le 10$), —C(CH$_3$)$_2$—, —C(CF$_3$)$_2$—, or —C(=O)NH—, $R^{51}$ to $R^{57}$ are the same or different and are each independently halogen, a substituted or unsubstituted C1 to C10 aliphatic organic group, or a substituted or unsubstituted C6 to C20 aromatic organic group, k41, k44, k45, k46, and k47 are each independently integers ranging from 0 to 4, k42, and k43 are each independently integers ranging from 0 to 3.

In another embodiment, in Chemical Formulae 1 and 2, $Ar^2$, $Ar^3$, $Ar^5$ and $Ar^6$ are the same or different in each repeating unit and are each independently selected from the following Chemical Formulae, but are not limited thereto.

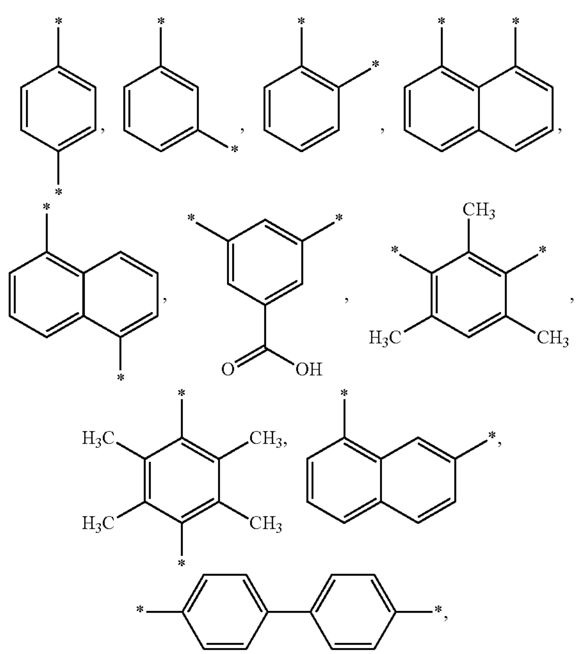

-continued

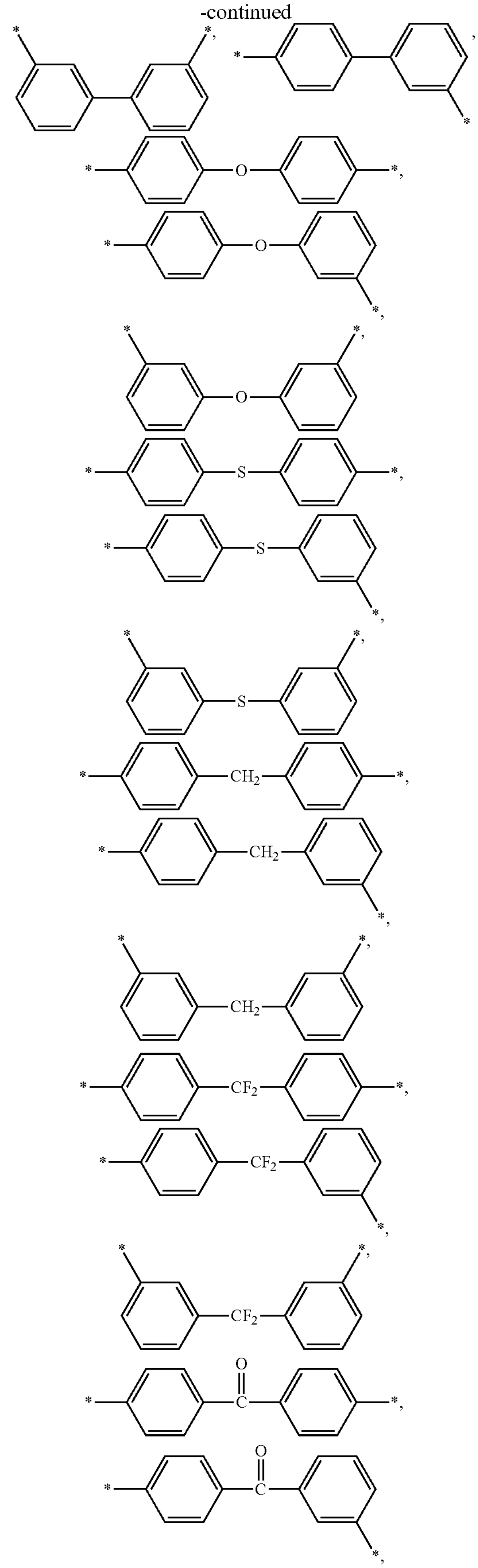

-continued

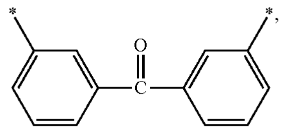
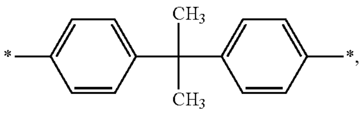
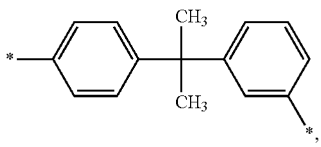
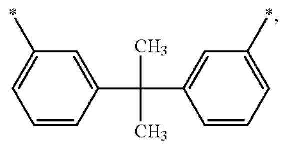
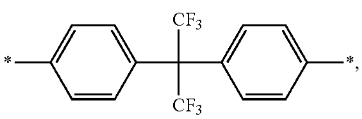
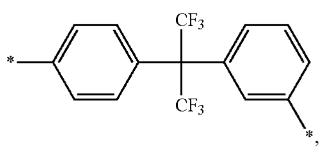
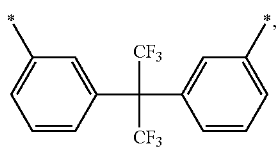
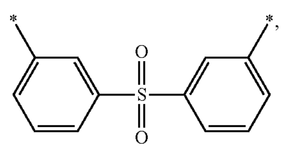
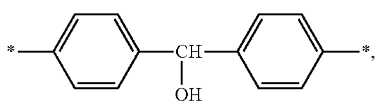
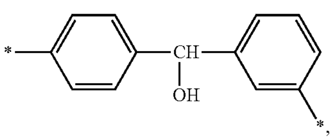
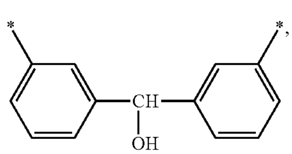
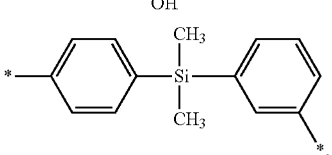
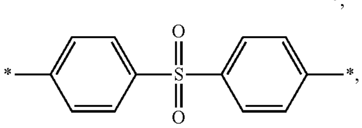
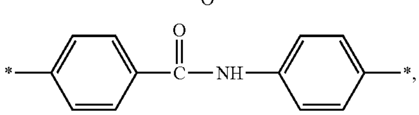

-continued

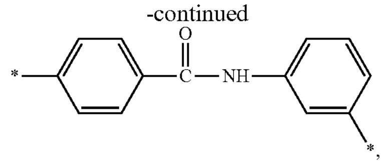
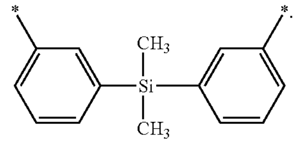

In an embodiment, in Chemical Formulae 3 and 4, $Ar^8$ and $Ar^{10}$ are the same or different in each repeating unit and are each independently selected from the following Chemical Formulae, but are not limited thereto.

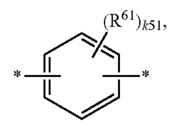
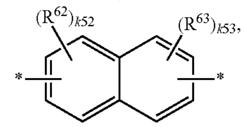
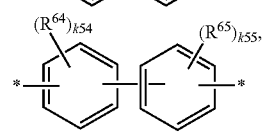
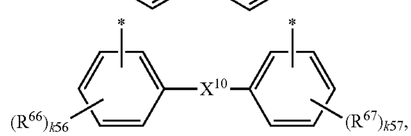
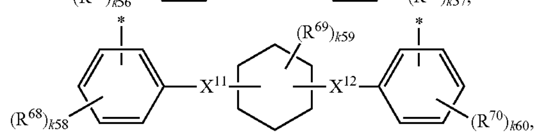
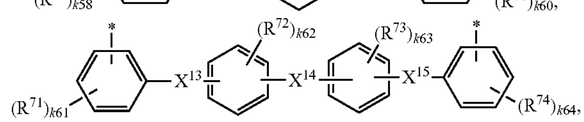
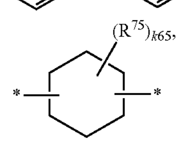
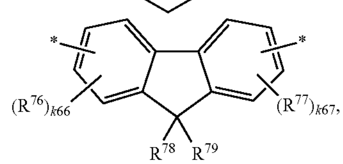
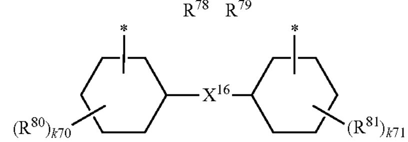

In the above Chemical Formulae, $X^{10}$ to $X^{15}$ are the same or different and are each independently a single bond, —O—, —S—, —C(═O)—, —CH(OH)—, —S(═O)$_2$—, —Si(CH$_3$)$_2$—, —(CH$_2$)$_p$— (wherein 1≤p≤10), —$(CF_2)_q$— (wherein 1≤q≤10), —$C(CH_3)_2$—, —$C(CF_3)_2$—, or —C(═O)NH—, $R^{61}$ to $R^{81}$ are the same or different and are each independently halogen, a substituted or unsubstituted C1 to C10 aliphatic organic group, or a substituted or unsubstituted C6 to C20 aromatic organic group, k51, k54, k55, k56, k57, k58, k59, k60, k61, k62, k63, and k64 are each independently integers ranging from 0 to 4, k52, k53, k66, and k67 are each independently integers ranging from 0 to 3, and k65, k70, and k71 are integers ranging from 0 to 10.

In an embodiment, in Chemical Formulae 3 and 4, $Ar^8$ and $Ar^{10}$ are the same or different in each repeating unit and are each independently selected from the following Chemical Formulae, but are not limited thereto.

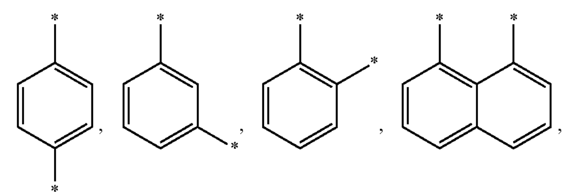
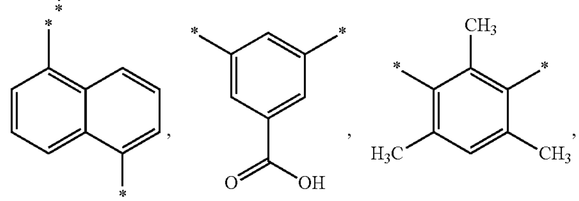
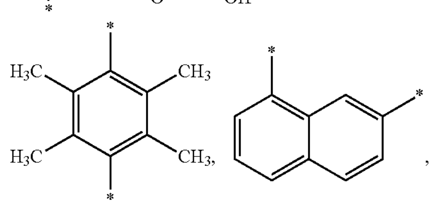
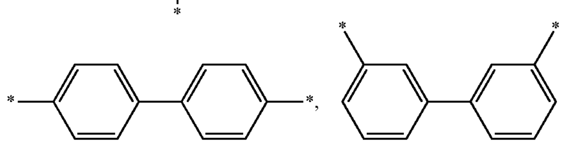
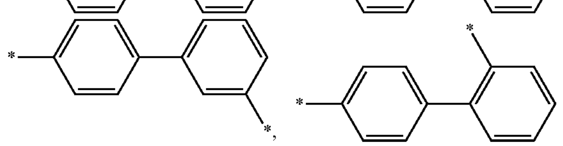
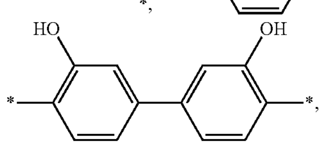
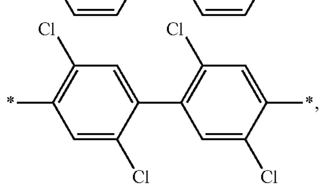
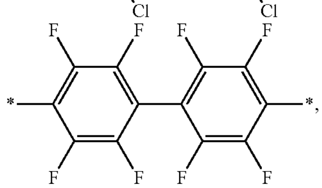

-continued

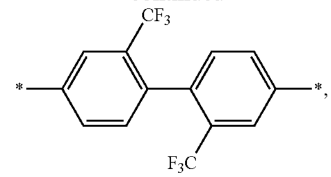
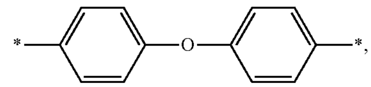
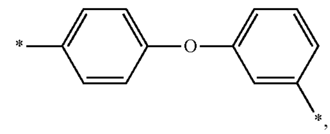
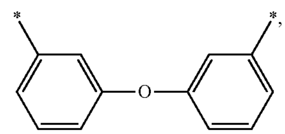
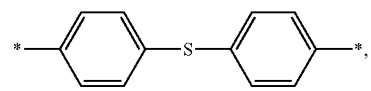
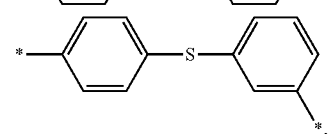
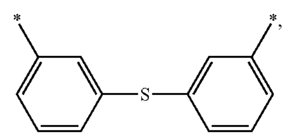
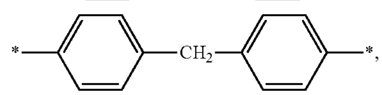
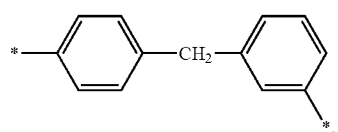
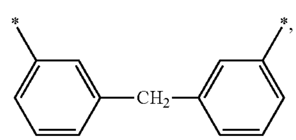
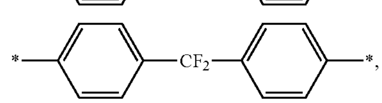
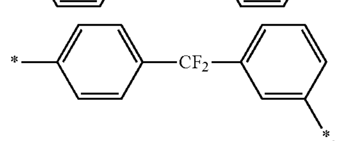
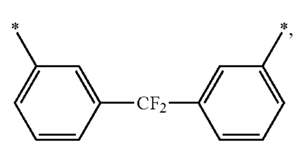
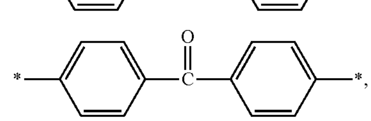

-continued
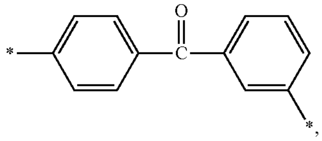
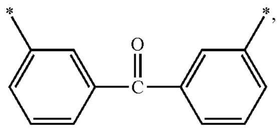
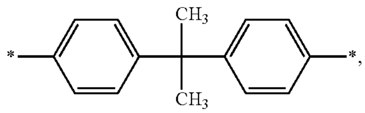
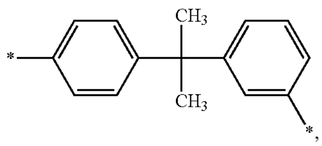
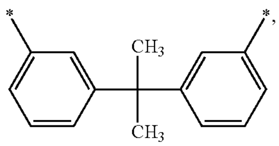
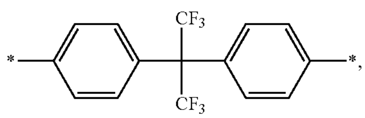
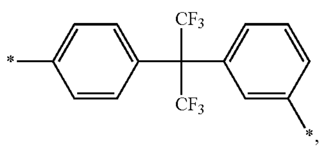
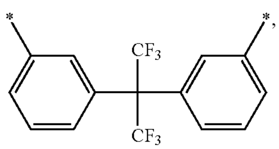
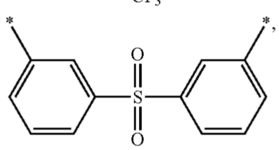
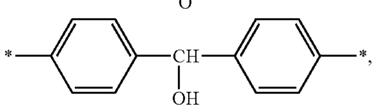
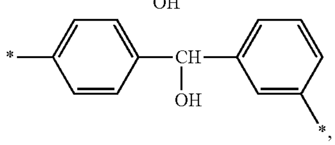
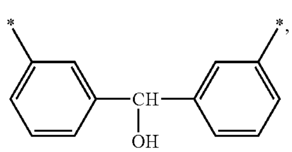
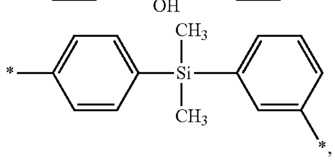
-continued
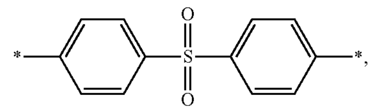
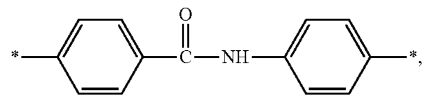
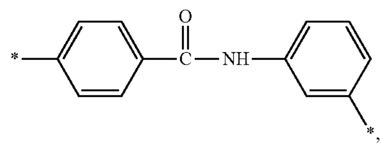
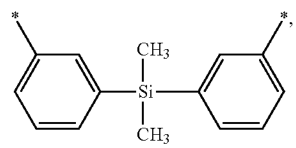
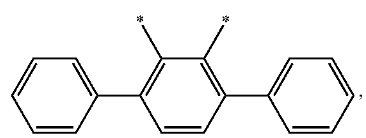
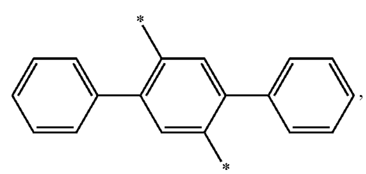
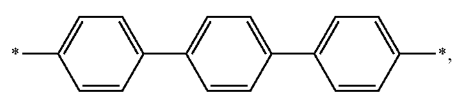
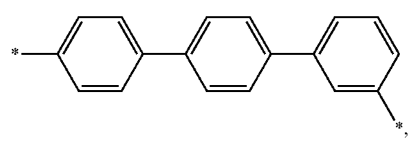
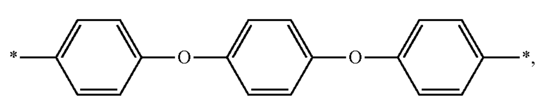
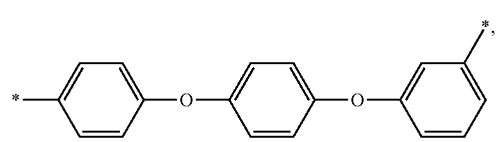
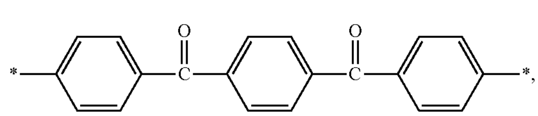

-continued

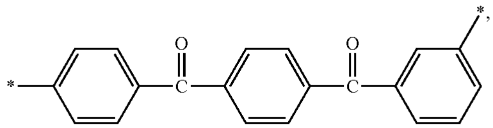

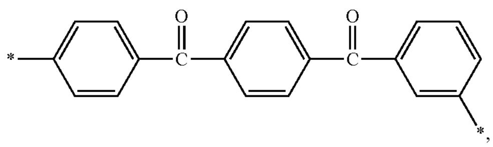

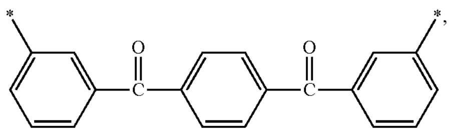

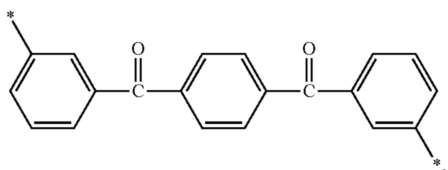

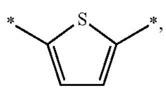

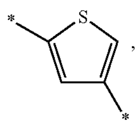

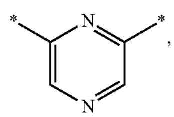

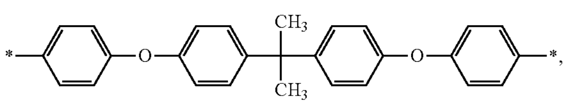

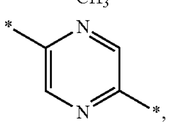

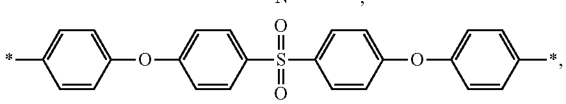

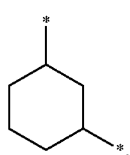

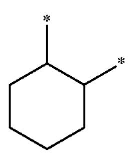

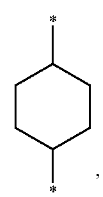

-continued

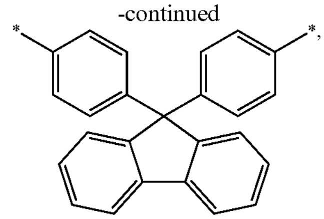

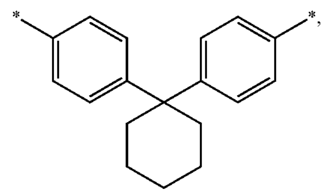

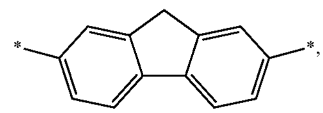

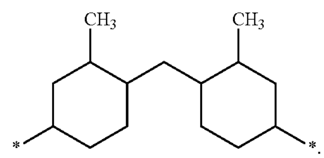

In Chemical Formulae 3 and 4, $Ar^8$ and $Ar^{10}$ may be a residual group derived from diamine.

The diamine may include 2,2'-bis(trifluoromethyl)benzidine ("TFDB"), 4,4'-(9-fluorenylidene)dianiline ("BAPF"), 4,4'-diaminodiphenyl sulfone ("DADPS"), bis(4-(4-aminophenoxy)phenyl) sulfone ("BAPS"), 2,2',5,5'-tetrachlorobenzidine, 2,7-diaminofluorene, 1,1-bis(4-aminophenyl) cyclohexane, 4,4'-methylenebis-(2-methylcyclohexylamine), 4,4'-diaminooctafluorobiphenyl, 3,3'-dihydroxybenzidine, 1,3-cyclohexanediamine, or a combination thereof, but is not limited thereto.

In an embodiment, the repeating unit represented by the above Chemical Formula 1 may include a repeating unit represented by the following Chemical Formulae 1-1 to 1-5, or a combination thereof, the repeating unit represented by the above Chemical Formula 2 may include a repeating unit represented by the following Chemical Formulae 2-1 to 2-5, or a combination thereof, the repeating unit represented by the above Chemical Formula 3 may include a repeating unit represented by the following Chemical Formulae 3-1 to 3-5, or a combination thereof, and the repeating unit represented by the above Chemical Formula 4 may include a repeating unit represented by the following Chemical Formulae 4-1 to 4-5, or a combination thereof, but are not limited thereto.

Chemical Formula 1-1

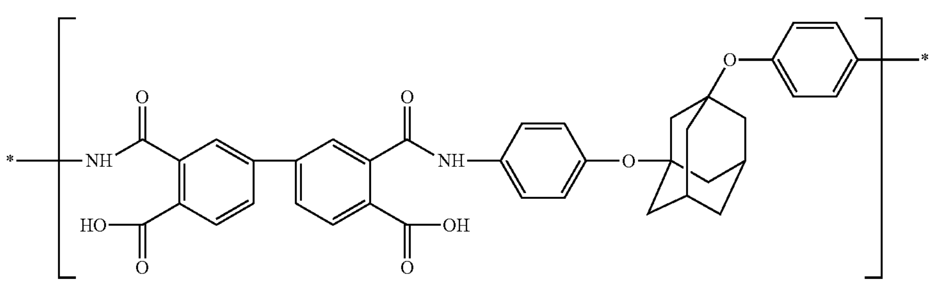

-continued
Chemical Formula 1-2
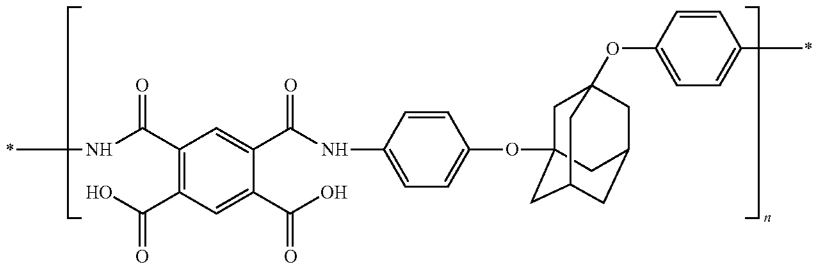
Chemical Formula 1-3
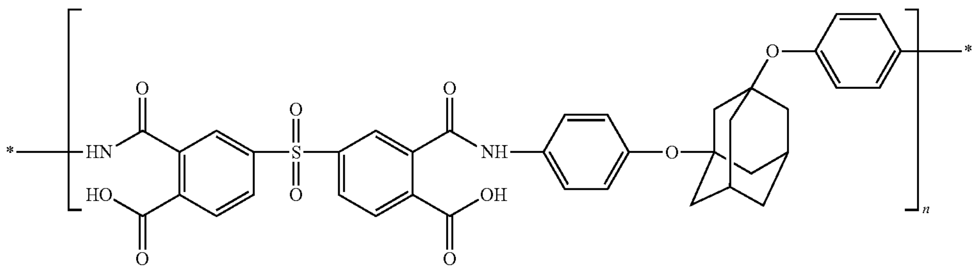
Chemical Formula 1-4
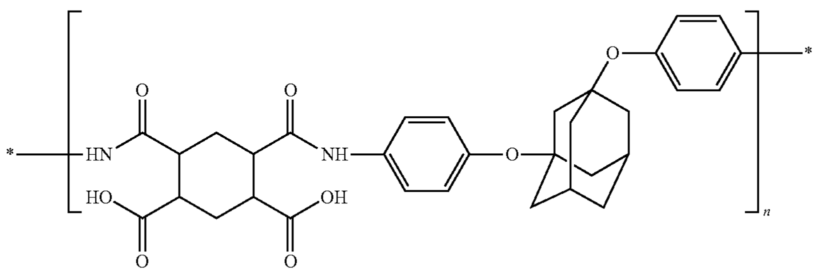
Chemical Formula 1-5
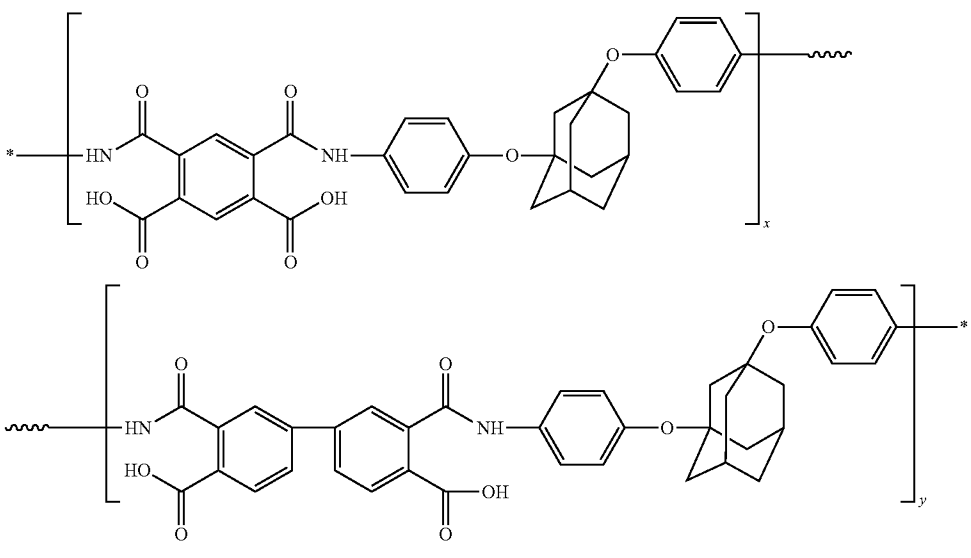
Chemical Formula 2-1
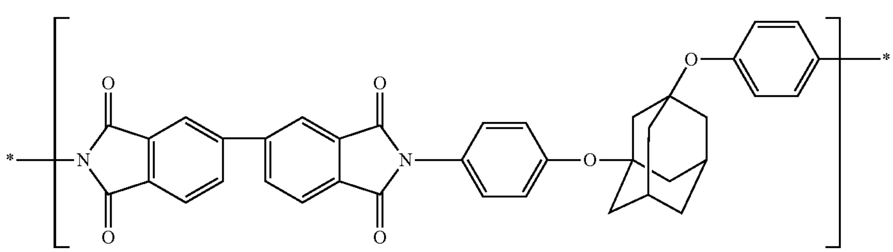

-continued
Chemical Formula 2-2
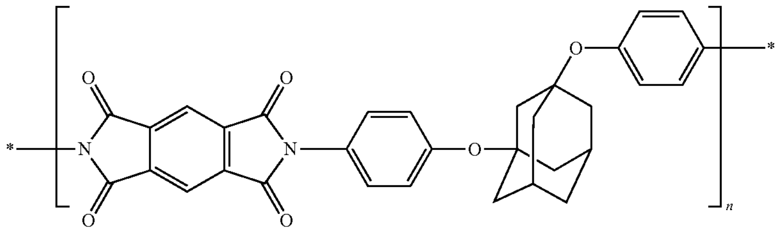
Chemical Formula 2-3
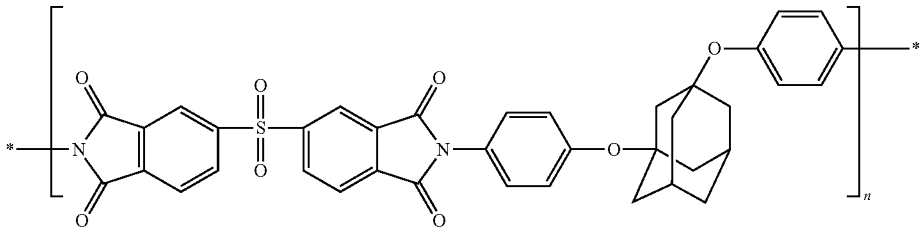
Chemical Formula 2-4
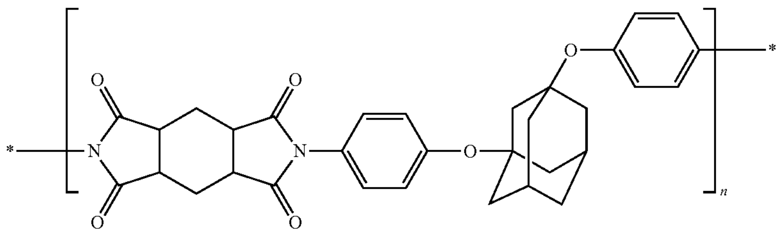
Chemical Formula 3-1
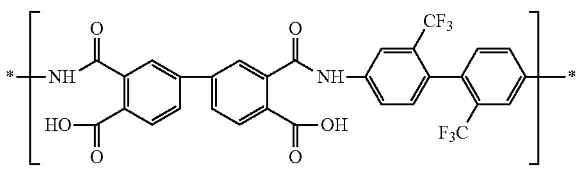
Chemical Formula 3-2
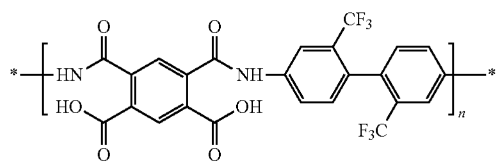
Chemical Formula 3-3
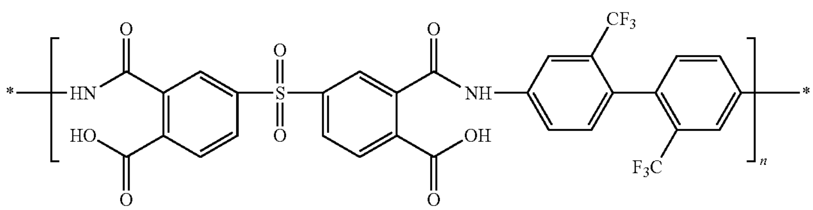
Chemical Formula 3-4
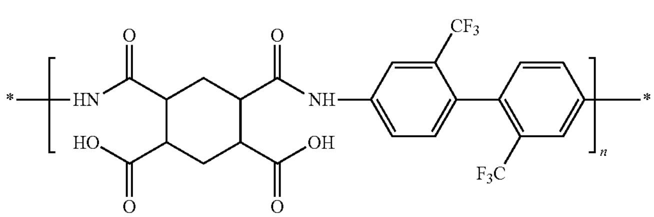
Chemical Formula 3-5
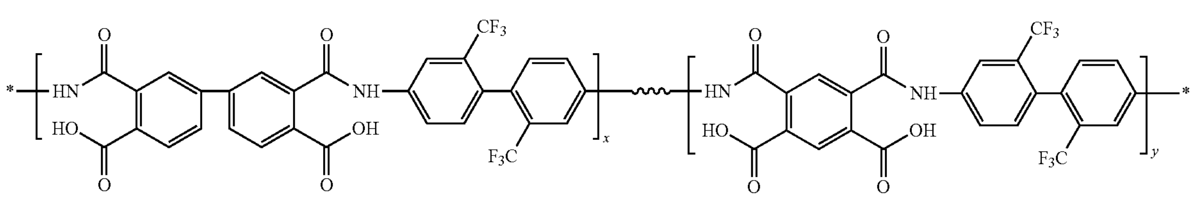

-continued

Chemical Formula 4-1

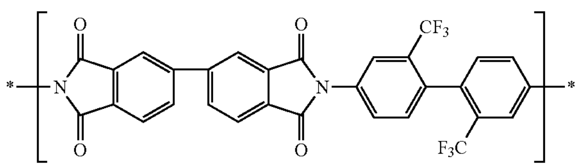

Chemical Formula 4-2

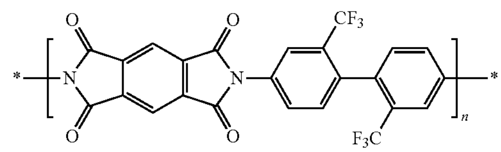

Chemical Formula 4-3

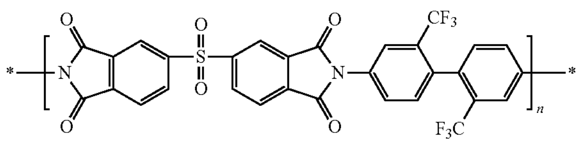

Chemical Formula 4-4

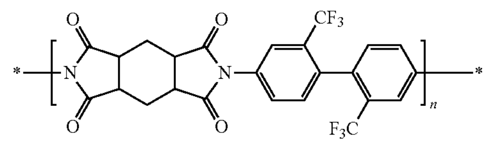

Chemical Formula 4-5

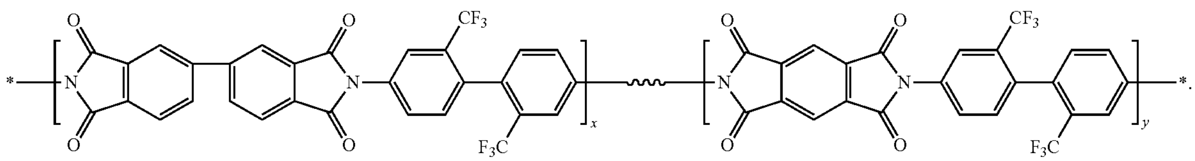

The copolymer may have a weight average molecular weight ("Mw") of about 1,000 g/mol to about 500,000 g/mol, specifically of about 5,000 g/mol to about 500,000 g/mol, more specifically of about 10,000 g/mol to about 500,000 g/mol.

When the copolymer has a weight average molecular weight within the range, a solution may be casted, which brings about easy processibility.

Even more specifically, the copolymer may have a weight average molecular weight (Mw) ranging from about 10,000 g/mol to about 150,000 g/mol.

In the copolymer, the repeating unit A may include the repeating unit represented by the above Chemical Formula 1 and the repeating unit represented by Chemical Formula 2 at a mole ratio of about 0.01:99.99 to about 99.99:0.01, specifically of about 0.1:99.9 to 99.9:0.1, more specifically of about 99:1 to 1:99.

The copolymer may have increased optical transmission characteristics and may possess low viscosity, and thus be suitable for spray-coating.

In particular, the repeating unit A may include a repeating unit represented by the above Chemical Formula 1 and a repeating unit represented by the above Chemical Formula 2 in a mole ratio ranging from about 0.60:0.40 to about 0.40:0.60.

In the copolymer, the repeating unit B may include the repeating unit represented by the above Chemical Formula 3 and the repeating unit represented by the above Chemical Formula 4 at a mole ratio of about 0.01:99.99 to about 99.99:0.01, specifically of about 0.1:99.9 to 99.9:0.1, more specifically of about 99:1 to 1:99.

The copolymer may have increased optical transmission characteristics and may possess low viscosity, and thus be suitable for spray-coating.

In particular, the repeating unit B may include a repeating unit represented by the above Chemical Formula 3 and a repeating unit represented by the above Chemical Formula 4 in a mole ratio ranging from about 0.60:0.40 to about 0.40:0.60.

The copolymer may include the repeating unit A and the repeating unit B in a mole ratio ranging from about 0.45:0.55 to about 0.55:0.45.

When the repeating unit A and the repeating unit B are included within this mole ratio range, the copolymer may have viscosity adjusted to be suitable for film casting.

The copolymer may be cross-linked.

For example, the copolymers may be connected to one another by reacting a multi-functional carboxylic acid and a multi-functional amine in the presence of a carbodiimide.

However, the copolymer connection is not limited thereto, the copolymers may be connected to one another in a generally-used cross-linking method.

When the cross-linked copolymers are used to manufacture a molded product, the molded product may have excellent mechanical characteristic and simultaneously, excellent flexibility. Such polymers are stable and have a low coefficient of thermal expansion ("CTE") and thus, excellent thermal stability, viscosity change and thus, suitable for higher long-term storage.

As a result, a copolymer according to an embodiment includes a repeating unit A having excellent optical properties and heat resistance and a repeating unit B having excellent optical properties. Thus, may improve the characteristics of a molded product including the same, for example, its transparency, heat resistance, mechanical strength, and flexibility.

Accordingly, the copolymer may be used to produce various molded products requiring transparency.

For example, the copolymer may be usefully applied to a substrate for a display, specifically, a substrate for a flexible display, a touch panel, a protective film for an optical disk, and the like.

In particular, the copolymer may have average transmittance of greater than or equal to about 80% in a wavelength range of about 380 nanometers ("nm") to about 800 nm.

When the copolymer has average transmittance within the range, the copolymer may be used in a molded product requiring transparency in various fields and have excellent color reproducibility.

In particular, the copolymer may have average transmittance ranging from about 80% to about 95% in a wavelength ranging from about 380 nm to about 800 nm.

According to another embodiment, an article including the copolymer is provided.

The article may be film, a fiber, or a coating material, but is not limited thereto.

The article may be formed of the copolymer through a dry-wet method, a dry method, or a wet method, but this disclosure is not limited thereto.

When a film among the articles is manufactured through the dry-wet method, the film is formed by extruding the copolymer from a spinner on a supporter such as a drum or an endless belt, and drying it and evaporating the solvent out of the film until the film is self-maintaining.

The drying may be performed at about 25° C. to about 220° C. for about 1 hour or less.

When the surface of the drum and/or the endless belt used for the drying process is flat, a film with a flat surface is acquired.

The film obtained after the drying process is delaminated from the supporter, and inputted to a wet process for demineralization and/or desolventization, and the manufacturing of the film is completed as it goes through elongation, drying, and/or heat treatment.

The elongation is done to an elongation ratio, which may range from about 0.8 to about 8 in terms of surface ratio. According to an embodiment, the elongation ratio may range from about 1.3 to about 8. Herein, the surface ratio is defined as a value obtained by dividing the area of a film after elongation by an area of the film before elongation. Herein, a number of 1 or less denotes a relaxed state. According to one embodiment, it may range from about 2.0 to about 6.

Meanwhile, the elongation may be performed not only in a surface direction but also in a thickness direction.

The heat treatment may be performed at a temperature of about 200° C. to about 500° C., particularly of about 250° C. to about 400° C., for about a few seconds to a few minutes.

Also, the film after elongation and heat treatment may be cooled slowly, particularly at a speed of about 50° C./second or lower.

The film may be formed as a single layer or as multiple layers.

The article including the copolymer for example a film, may have a thickness of about 0.1 micrometers ("μm") to about 200 μm, specifically from 1 μm to 200 μm, but the disclosure is not limited to this range and the thickness may be adjusted properly according to the usage.

The article may have average transmittance of greater than or equal to about 80% in a wavelength range of about 380 nm to about 800 nm.

When the article has light transmittance within this range, the article may have excellent color reproducibility.

In an embodiment, the article may have average transmittance of about 80% to about 95% in a wavelength range of about 380 nm to about 800 nm.

The article may have a yellow index ("YI") of less than or equal to 5.

When the yellow index (YI) of the article is within the range, the article may be transparent and colorless.

In an embodiment, the article may have a yellow index (YI) of about 0.5 to about 3.

The article may have haze of less than or equal to about 5%.

When the haze of the article is within the range, the article may be transparent enough to have excellent clarity.

In an embodiment, the article may have haze of less than or equal to about 1%.

The article may have a coefficient of thermal expansion ("CTE") of less than or equal to about 50 ppm/° C.

When the coefficient of thermal expansion of the article is within this range, the article may have excellent heat resistance.

In an embodiment, the article may have a coefficient of thermal expansion of less than or equal to about 30 parts per million per degree Celsius ("ppm/° C."), and specifically less than or equal to about 25 ppm/° C.

The article may have a weight loss ratio of less than or equal to about 1% at about 400° C.

Herein, the article may not be decomposed at a high temperature and suppress gas discharge and thus, have excellent thermal stability.

In particular, the article may have a weight loss ratio of less than or equal to about 0.2% at about 350° C.

Since the article includes the copolymer which has excellent transparency, heat resistance, mechanical strength, and flexibility, the article may have excellent transparency, heat resistance, mechanical strength, and flexibility as well.

Therefore, the article may be used for diverse areas, such as a substrate for a device, a substrate for a display device, an optical film, an integrated circuit ("IC") package, a multilayer flexible printed circuit ("FRC"), a tape, a touch panel, and a protective film for an optical disk.

Another embodiment provides a display device including the article.

Particularly, the display device may include a liquid crystal display ("LCD"), organic light emitting diode ("OLED"), active matrix organic light emitting diode ("AMOLED"), and the like, but is not limited thereto.

Among the display devices, a liquid crystal display ("LCD") is described by referring to FIG. 1.

FIG. 1 is a cross-sectional view of a liquid crystal display ("LCD") in accordance with an embodiment.

Referring to FIG. 1, the liquid crystal display ("LCD") includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110.

The source electrode 173 and the drain electrode 175 are isolated from each other and face each other with the gate electrode 124 between them.

One gate electrode 124, one source electrode 173, and one drain electrode 175 constitute one thin film transistor ("TFT") together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180.

The pixel electrode 191 is connected to the drain electrode 175 through the contact hole 185.

The common electrode panel 200 will now be described.

In the common electrode panel 200, a light blocking member 220 referred to as a black matrix is disposed on a substrate 210, a color filter 230 is disposed on the substrate 210 and the light blocking member 220, and a common electrode 270 is formed on the color filter 230.

Herein, the substrates 110 and 210 may each be an article including the copolymer.

Figure 2:
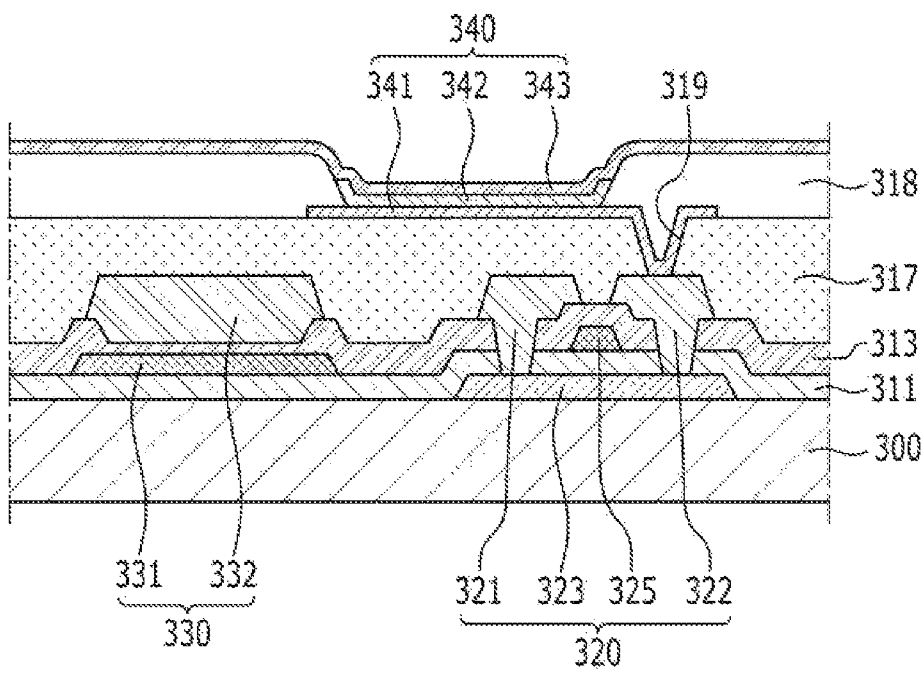
FIG. 2 is a cross-sectional view of an organic light emitting diode ("OLED") according to an embodiment.

Meanwhile, among the display devices, an organic light emitting diode ("OLED") is described by referring to FIG. 2.

FIG. 2 is a cross-sectional view of an organic light emitting diode ("OLED") in accordance with an embodiment.

Referring to FIG. 2, a thin film transistor 320, a capacitor 330 and an organic light emitting diode 340 are formed on a substrate 300.

The thin film transistor 320 includes a source electrode 321, a semiconductor layer 323, a gate electrode 325, and a drain electrode 322, and the capacitor 330 includes a first capacitor 331 and a second capacitor 332. The organic light emitting diode 340 includes a pixel electrode 341, an intermediate layer 342, and an opposed electrode 343.

According to an embodiment of this disclosure, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300.

The source electrode 321 and the drain electrode 322 are isolated from each other, and they face each other with the gate electrode 325 between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317.

The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be formed into an article including the copolymer.

Example

Hereafter, embodiments of this disclosure are described in detail with reference to examples and comparative examples. The following examples and comparative examples are not restrictive but are illustrative.

Synthesis Example 1

Synthesis of 1,3-bis(4-aminophenoxy)adamantane 1,3-bis(4-aminophenoxy)adamantine is synthesized according to the following Reaction Scheme 1.

Reaction Scheme 1

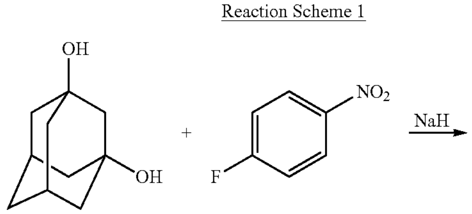

-continued

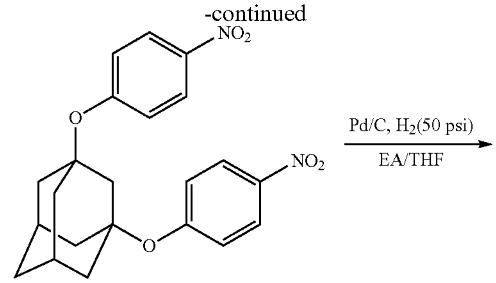

B

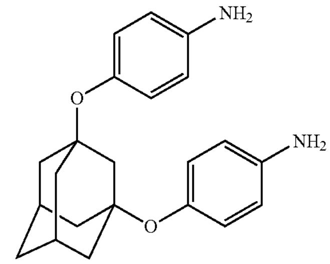

C

First, about 100 g (about 0.59 mol) of 1,3-dihydroxyadamantane (1,3-dihydroxyadamantane) is put in a 3.0 L round-bottomed flask, and a mixed solvent of about 500 mL of dimethyl formamide ("DMF") and about 1.0 L of benzene is added thereto for dispersion.

Next, about 57.4 g (1.31 mol) of NaH is added to the dispersed solution at room temperature, and the mixture is refluxed for about 1 hour.

Then, the reactant is cooled down to room temperature, and hydrogen gas generated during the reflux is removed using nitrogen gas.

Then, about 166.5 g (about 1.18 mol) of 1-fluoro-4-nitrobenzene (1-fluoro-4-nitrobenzene) diluted in about 100 mL of DMF is added to the resulting reactant. The mixture is heated up to about 80° C.

The heated reactant is refluxed for about 4 hours and then, cooled down to room temperature.

Then, 2.0 L of water at about 0° C. is added to the cooled reactant, and a solid produced therein is filtered.

The filtered solid is sufficiently cleaned with water and dried under vacuum, obtaining 208 g of a compound represented by Chemical Formula B.

Then, the compound is recrystallized, obtaining 190 g of 1,3-bis(4-aminophenoxy)adamantine represented by Chemical Formula C.

Example 1

Preparation of Copolymer and Film 0.1 mol of 3,3',4,4'-biphenyltetracarboxylic dianhydride ("BPDA"), 0.075 mol of 2,2'-bis(trifluoromethyl)benzidine ("TFDB"), and 0.025 mol of the 1,3-bis(4-aminophenoxy) adamantine prepared according to Synthesis Example 1 are reacted in N,N-dimethyl acetamide ("DMAC") at 5° C. for 1 hour in a 500 mL round-bottomed flask, obtaining a copolymer.

The copolymer has a weight average molecular weight of 80,000 g/mol.

The copolymer is coated on a glass substrate and then, pre-baked on an about 80° C. hot plate for about 1 hour.

Then, the pre-baked substrate is heated up to about 350° C. at a speed of about 3° C./min for about one hour, fabricating a film.

The film is about 40 μm thick.

Example 2

Preparation of Copolymer and Film 0.1 mol of 3,3',4,4'-biphenyltetracarboxylic dianhydride ("BPDA"), 0.090 mol of 2,2'-bis(trifluoromethyl)benzidine ("TFDB"), and 0.010 mol of the 1,3-bis(4-aminophenoxy) adamantine prepared according to Synthesis Example 1 are reacted in N,N-dimethyl acetamide ("DMAC") at 5° C. for 1 hour in a 500 mL round-bottomed flask, obtaining a copolymer.

The obtained copolymer has a weight average molecular weight of 120,000 g/mol.

The copolymer is coated on a glass substrate and then, pre-baked on an about 80° C. hot plate for about 1 hour.

Then, the pre-baked substrate is heated up to about 350° C. at a speed of about 3° C./min for about one hour, fabricating a film.

The film is about 42 μm thick.

Example 3

Preparation of Copolymer and Film 0.1 mol of 3,3',4,4'-biphenyltetracarboxylic dianhydride ("BPDA"), 0.095 mol of 2,2'-bis(trifluoromethyl)benzidine ("TFDB"), and 0.005 mol of the 1,3-bis(4-aminophenoxy) adamantine prepared according to Synthesis Example 1 are reacted in N,N-dimethyl acetamide ("DMAC") at 5° C. for 1 hour in a 500 mL round-bottomed flask, obtaining a copolymer.

The obtained copolymer has a weight average molecular weight of 90,000 g/mol.

The copolymer is coated on a glass substrate and then, pre-baked on an about 80° C. hot plate for about 1 hour.

Next, the pre-baked substrate is heated up to about 350° C. at a speed of about 3° C./min for about one hour, fabricating a film.

The film is about 25 μm thick.

Comparative Example 1

Preparation of Copolymer and Film 0.075 mol of 3,3',4,4'-biphenyltetracarboxylic dianhydride ("BPDA"), 0.025 mol of 2,2-bis-(3,4-dicarboxylphenyl) hexafluoropropane dianhydride ("6FDA"), and 0.1 mol of 2,2'-bis(trifluoromethyl)benzidine ("TFDB") are reacted in N,N-dimethyl acetamide ("DMAC") at 5° C. for 1 hour in a 500 mL round-bottomed flask, obtaining a copolymer.

The obtained copolymer has a weight average molecular weight of 75,000 g/mol

The copolymer is coated on a glass substrate and then, pre-baked on an about 80° C. hot plate for about 1 hour.

Then, the pre-baked copolymer is heated up to 350° C. at a speed of about 3° C./min for about one hour, fabricating a film.

The film is about 34 μm thick.

Comparative Example 2

Preparation of Copolymer and Film 0.1 mol of 3,3',4,4'-biphenyltetracarboxylic dianhydride ("BPDA") and 0.1 mol of 2,2'-bis(trifluoromethyl)benzidine ("TFDB") are reacted in N,N-dimethyl acetamide ("DMAC") at 5° C. for 1 hour in 500 mL round-bottomed flask, preparing a copolymer.

The copolymer has a weight average molecular weight of 132,000 g/mol.

Next, the copolymer is coated on a glass substrate and pre-baked on an about 80° C. hot plate for about one hour.

Then, the pre-baked substrate is heated up to about 350° C. at a speed of about 3° C./min for about one hour for about one hour, fabricating a film.

The film is about 50 μm thick.

Experimental Example 1

Thermal Stability

The films according to Examples 1 to 3 and Comparative Examples 1 and 2 are respectively evaluated regarding thermal stability using a thermogravimetric analyzer TGA Q5000 (TA instruments Inc.) (heating rate: 10° C./min), and their thermal decomposition onset temperature (° C.) and weight loss ratio (%) depending on a temperature are provided in the following Table 1.

Experimental Example 2

Coefficient of Thermal Expansion

Coefficients of thermal expansion ("CTE") of the films prepared according to Example 1 to 3 and Comparative Examples 1 and 2 were respectively measured using a thermo mechanical analyzer (5° C./min, pre-load: 10 mN, TMA 2940; TA Instrument).

The results are provided in the following Table 1.

Experimental Example 3

Optical Properties

Light transmittance, haze, and yellowness index of the films prepared according to Examples 1 to 3 and Comparative Examples 1 and 2 were measured using a KONICA MINOLTA spectrophotometer to evaluate optical properties of the respective polymers. The results are provided in the following Table 1.

TABLE 1

| | Onset temperature (° C.) | Weight loss ratio(%) 350° C. | Coefficient of thermal expansion (ppm/° C., 50° C. to 150° C.) | Average transmittance (%, 380 nm to 800 nm) |
|---|---|---|---|---|
| Example 1 | 517.05 | 0.10 | 28 | 85.74 |
| Example 2 | 553.54 | 0.10 | 22 | 86.37 |
| Example 3 | 563.32 | 0.14 | 25 | 87.29 |
| Comparative Example 1 | 582.7 | 0.16 | 26 | 87.8 |
| Comparative Example 2 | 585 | 0.15 | 24 | 86 |

As shown in Table 1, the films prepared according to Examples 1 to 3 have less weight loss depending on a temperature than the ones prepared according to Comparative Examples 1 and 2 and thus, excellent thermal stability. The films prepared according to Examples 1 to 3 also have a small thermal expansion coefficient and thus, excellent heat resistance.

In addition, the films prepared according to Examples 1 to 3 have optical properties equivalent to the properties of the films prepared according to Comparative Examples 1 and 2.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A copolymer comprising:

a repeating unit A comprising a repeating unit represented by Chemical Formula 1, a repeating unit represented by Chemical Formula 2, or a combination thereof; and a repeating unit B comprising a repeating unit represented by Chemical Formula 3, a repeating unit represented by Chemical Formula 4, or a combination thereof:

Chemical Formula 1

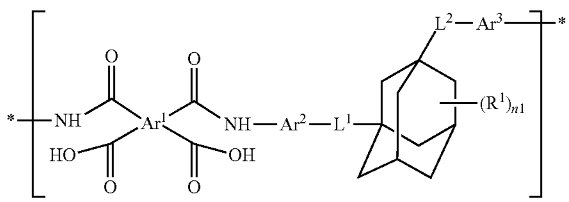

Chemical Formula 2

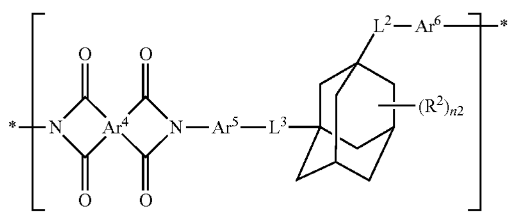

wherein, in Chemical Formulae 1 and 2, $Ar^1$ and $Ar^4$ are the same or different in each repeating unit and are each independently a substituted or unsubstituted tetravalent C6 to C30 aromatic organic group, wherein the aromatic organic group is present singularly; two or more groups are linked to each other to provide a condensed ring system; or two or more groups are linked to each other through a single bond, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(═O)NH—, $Ar^2$, $Ar^3$, $Ar^5$ and $Ar^6$ are the same or different in each repeating unit and are each independently a substituted or unsubstituted divalent C6 to C30 aromatic organic group, wherein the aromatic organic group is present singularly; two or more aromatic groups are linked to each other to provide a condensed ring system; or two or more aromatic groups are linked to each other through a single bond, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(═O)NH—, $L^1$, $L^2$, $L^3$, and $L^4$ are the same or different in each repeating unit and are each independently —O—, —C(═O)—, —C(═O)O—, —CH$_2$O—, or —Si(R$^{200}$R$^{201}$)O— wherein $R^{200}$ and $R^{201}$ are each independently a C1 to C10 alkyl group, a C1 to C10 alkoxy group, a C6 to C12 aryl group, or a C6 to C12 aryloxy group, $R^1$ and $R^2$ are the same or different in each repeating unit and are each independently a C1 to C5 aliphatic organic group, and n1 and n2 are the same or different in each repeating unit and are each independently integers ranging from 0 to 14, Chemical Formula 3

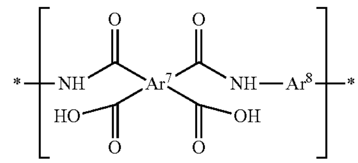

Chemical Formula 4

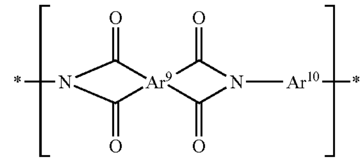

wherein, in Chemical Formulae 3 and 4, $Ar^7$ and $Ar^9$ are the same or different in each repeating unit and are each independently a substituted or unsubstituted tetravalent C6 to C30 aromatic organic group, wherein the aromatic organic group, is present singularly; two or more groups are linked to each other to provide a condensed ring system; or two or more groups are linked to each other through a single bond, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(═O)NH—, and $Ar^8$ and $Ar^{10}$ are the same or different in each repeating unit and are each independently a substituted or unsubstituted divalent C6 to C30 aromatic organic group, a substituted or unsubstituted divalent C3 to C30 alicyclic organic group, or a substituted or unsubstituted divalent fluorenyl group, wherein the aromatic organic group or the alicyclic organic group is present singularly; two or more groups are linked to each other to provide a condensed ring system; or two or more groups are linked to each other through a single bond.

2. The polymer of claim 1, wherein $Ar^1$, $Ar^4$, $Ar^7$, and $Ar^9$ are the same or different in each repeating unit and are each independently selected from the following Chemical Formulae:

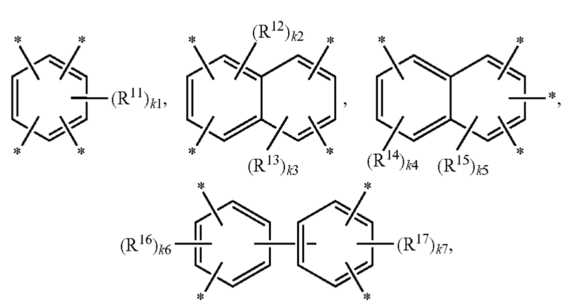

-continued

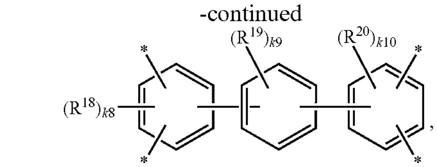

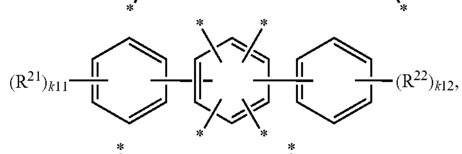

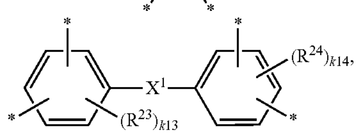

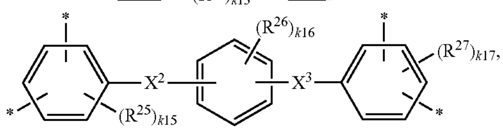

wherein, in the above Chemical Formulae, $X^1$ to $X^3$ are the same or different and are independently a single bond, —O—, —S—, —C(═O)—, —CH(OH)—, —S(═O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(═O)NH—, $R^{11}$ to $R^{27}$ are the same or different and are each independently halogen, a substituted or unsubstituted C1 to C10 aliphatic organic group, or a substituted or unsubstituted C6 to C20 aromatic organic group, k1, k2, and k3 are each independently integers ranging from 0 to 2, k4, k6, k7, k8, k10, k13, k14, k15, and k17 are each independently integers ranging from 0 to 3 k5 is an integer of 0 or 1, k9 and k16 are each independently integers ranging from 0 to 4, and k11 and k12, are each independently integers ranging from 0 to 5.

3. The copolymer of claim 1, wherein $Ar^1$, $Ar^4$, $Ar^7$, and $Ar^9$ are the same or different in each repeating unit and are each independently selected from the following Chemical Formulae:

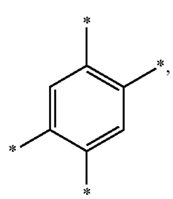

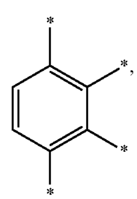

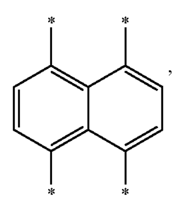

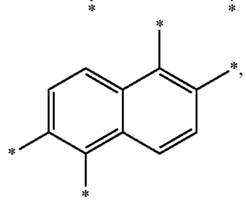

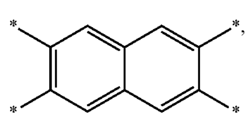

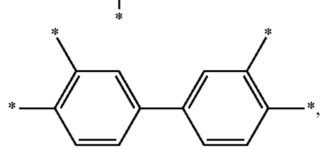

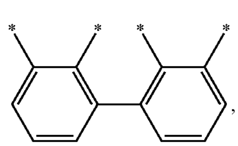

-continued

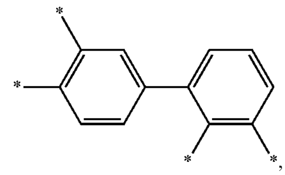

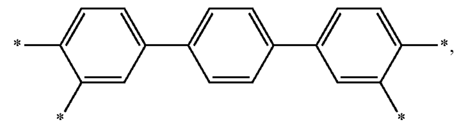

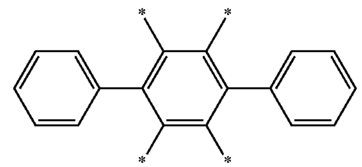

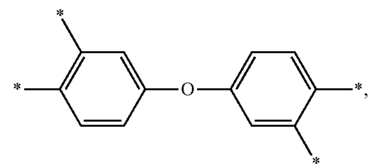

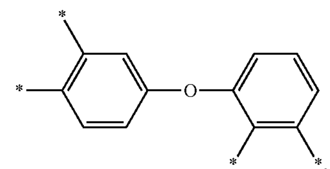

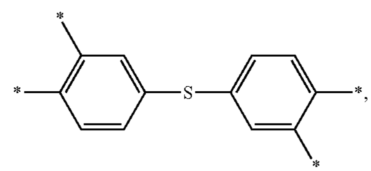

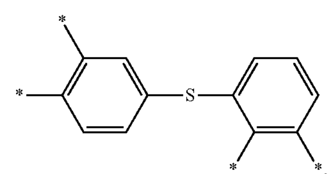

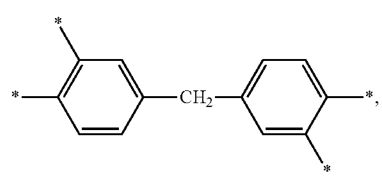

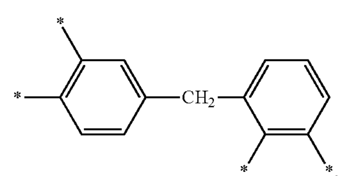

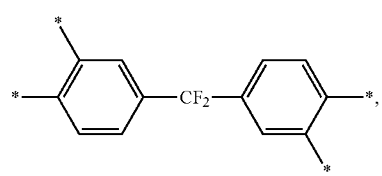

-continued
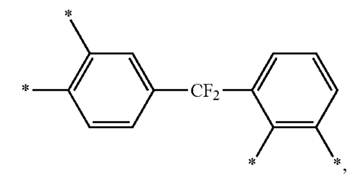
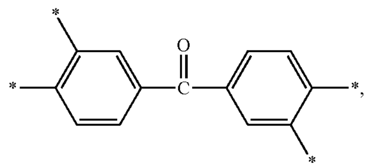
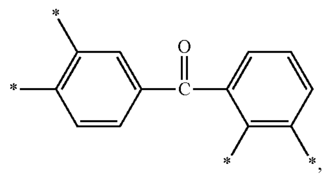
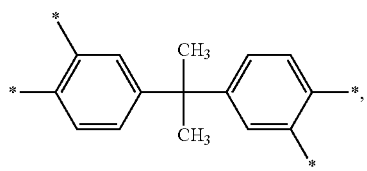
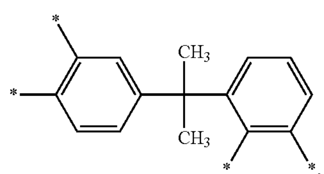
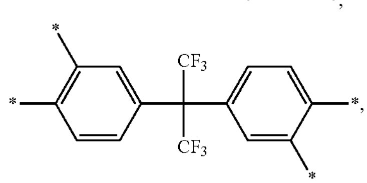
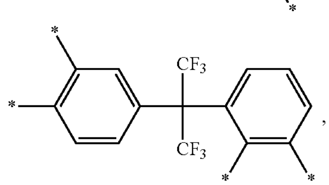
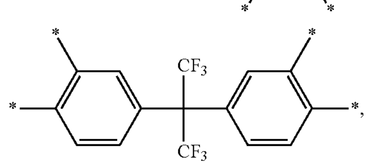
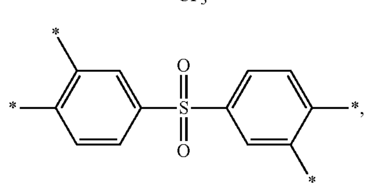
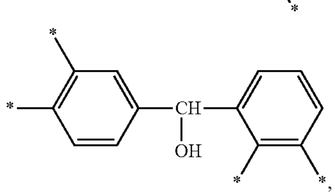
-continued
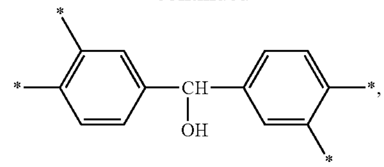
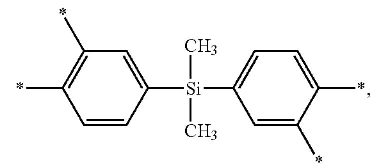
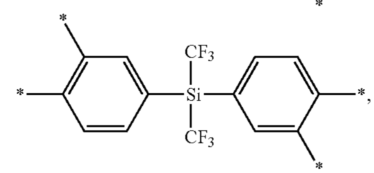
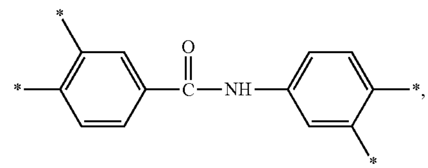
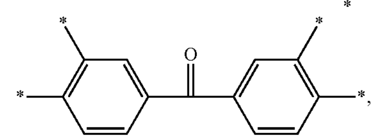
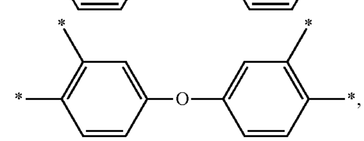
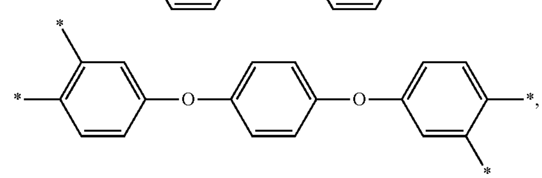
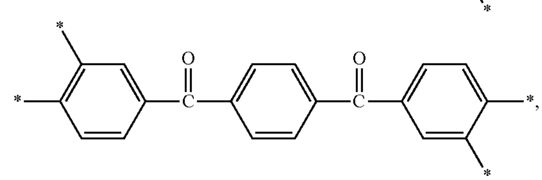
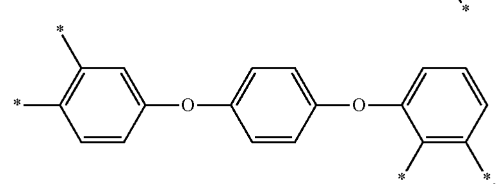
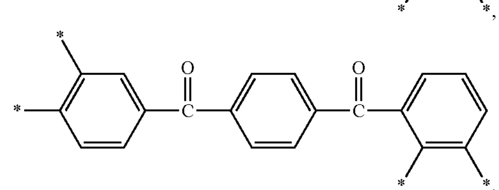
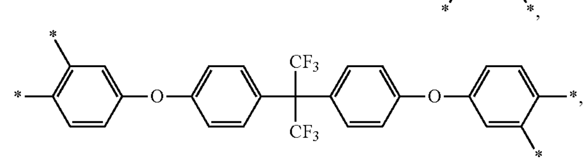

-continued

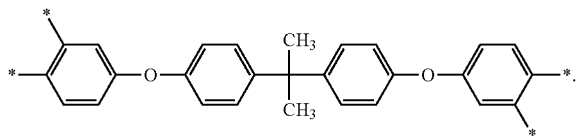

4. The copolymer of claim 1, wherein $Ar^2$, $Ar^3$, $Ar^5$, and $Ar^6$ are the same or different in each repeating unit and are each independently selected from the following Chemical Formulae:

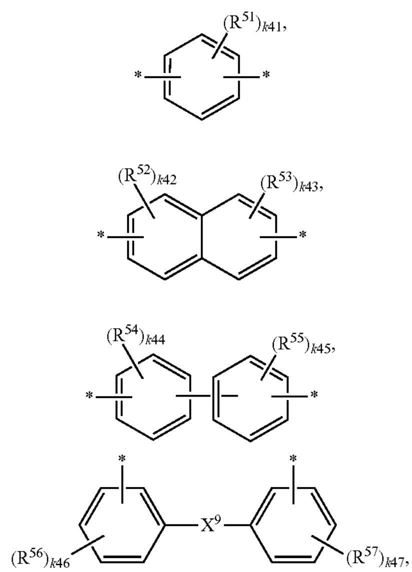

wherein, in the above Chemical Formulae, $X^9$ is —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $R^{51}$ to $R^{57}$ are the same or different and are each independently halogen, a substituted or unsubstituted C1 to C10 aliphatic organic group, or a substituted or unsubstituted C6 to C20 aromatic organic group, k41, k44, k45, k46, and k47 are each independently integers ranging from 0 to 4, and k42, and k43 are each independently integers ranging from 0 to 3.

5. The copolymer of claim 1, wherein $Ar^2$, $Ar^3$, $Ar^5$, and $Ar^6$ are the same or different in each repeating unit and are each independently selected from the following Chemical Formulae:

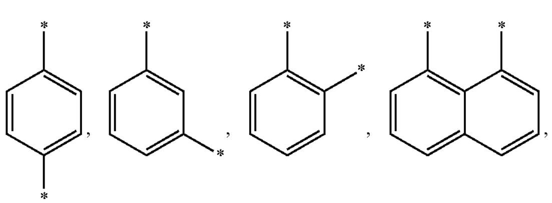

-continued

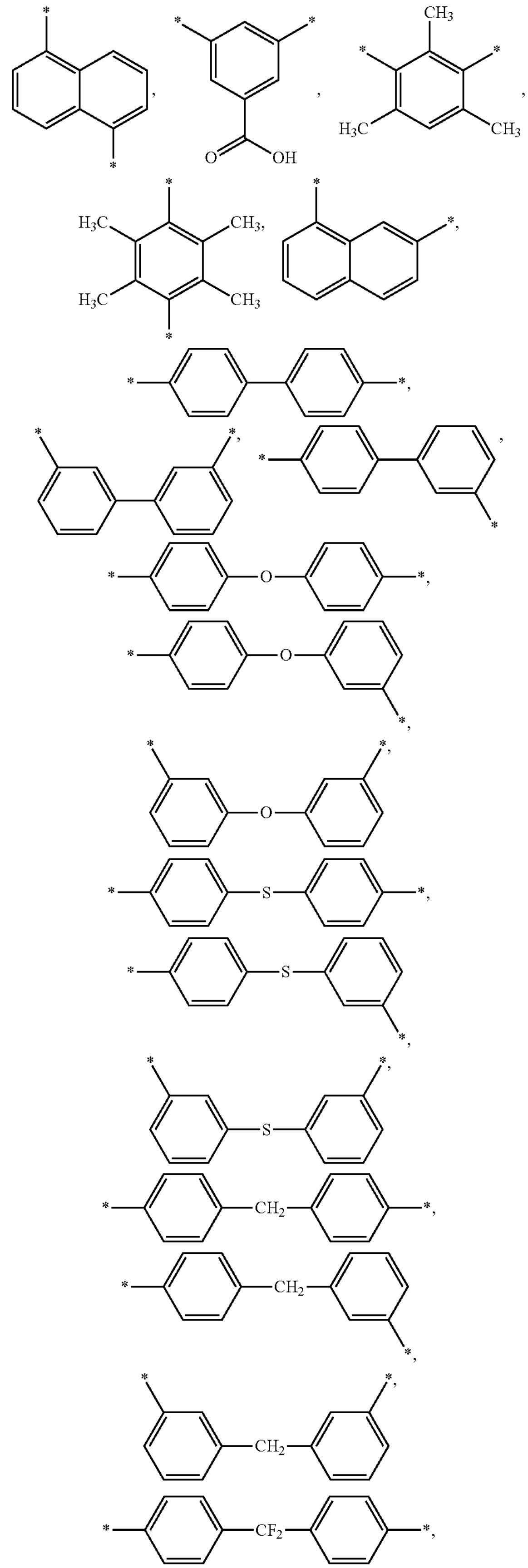

-continued
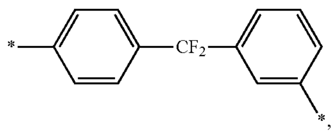
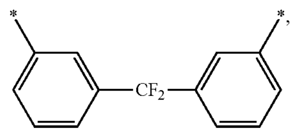
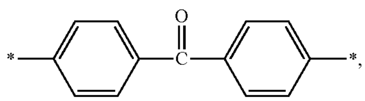
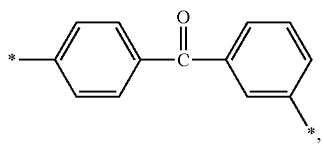
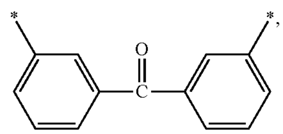
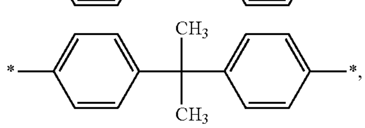
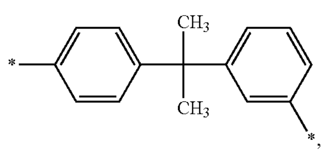
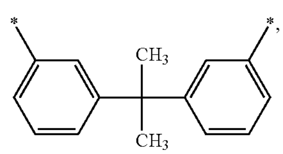
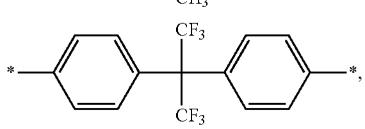
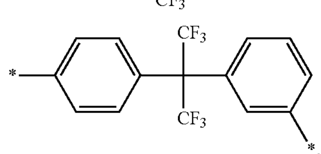
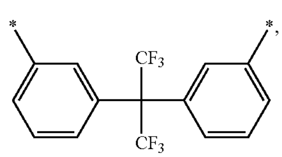
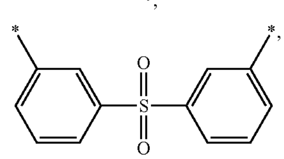
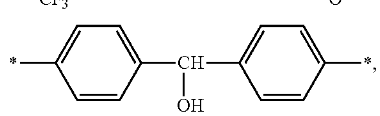
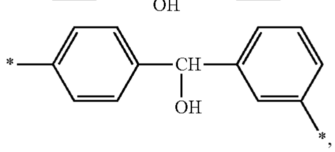
-continued
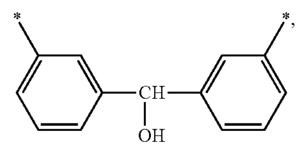
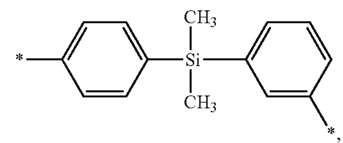
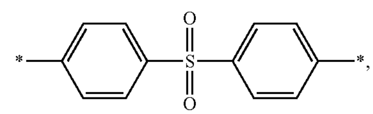
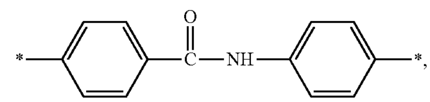
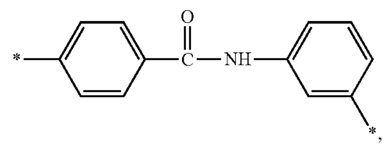
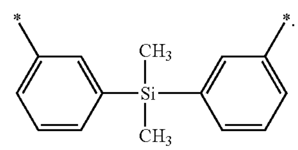
6. The copolymer of claim 1, wherein $Ar^8$ and $Ar^{10}$ are the same or different in each repeating unit and are each independently selected from the following Chemical Formulae:
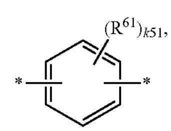
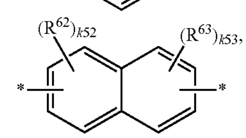
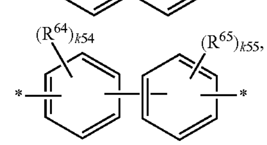
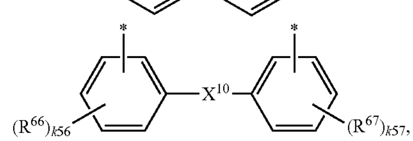
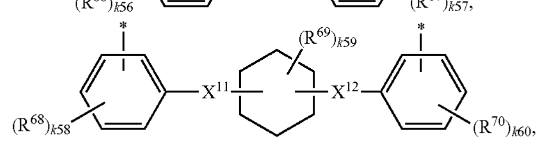
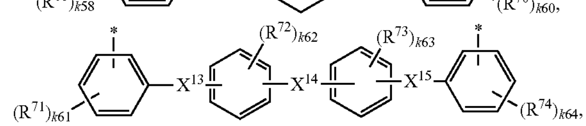

-continued

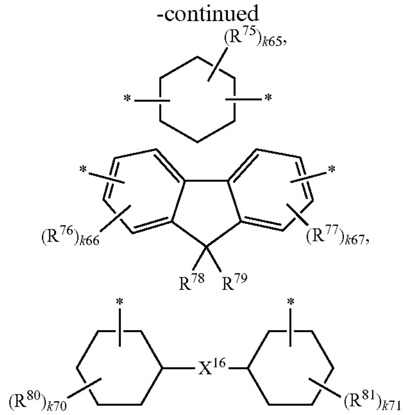

wherein, in the above Chemical Formulae, $X^{10}$ to $X^{15}$ are the same or different and are each independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $R^{61}$ to $R^{81}$ are the same or different and are each independently halogen, a substituted or unsubstituted C1 to C10 aliphatic organic group, or a substituted or unsubstituted C6 to C20 aromatic organic group, k51, k54, k55, k56, k57, k58, k59, k60, k61, k62, k63, and k64 are each independently integers ranging from 0 to 4, k52, k53, k66, and k67 are each independently integers ranging from 0 to 3, and k65, k70, and k71 are integers ranging from 0 to 10.

7. The copolymer of claim 1, wherein $Ar^8$ and $Ar^{10}$ are the same or different in each repeating unit and are each independently selected from Chemical Formulae:

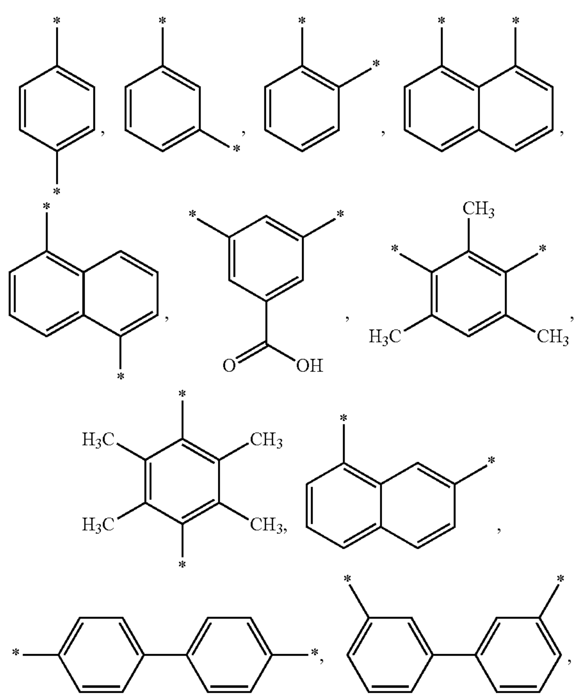

-continued

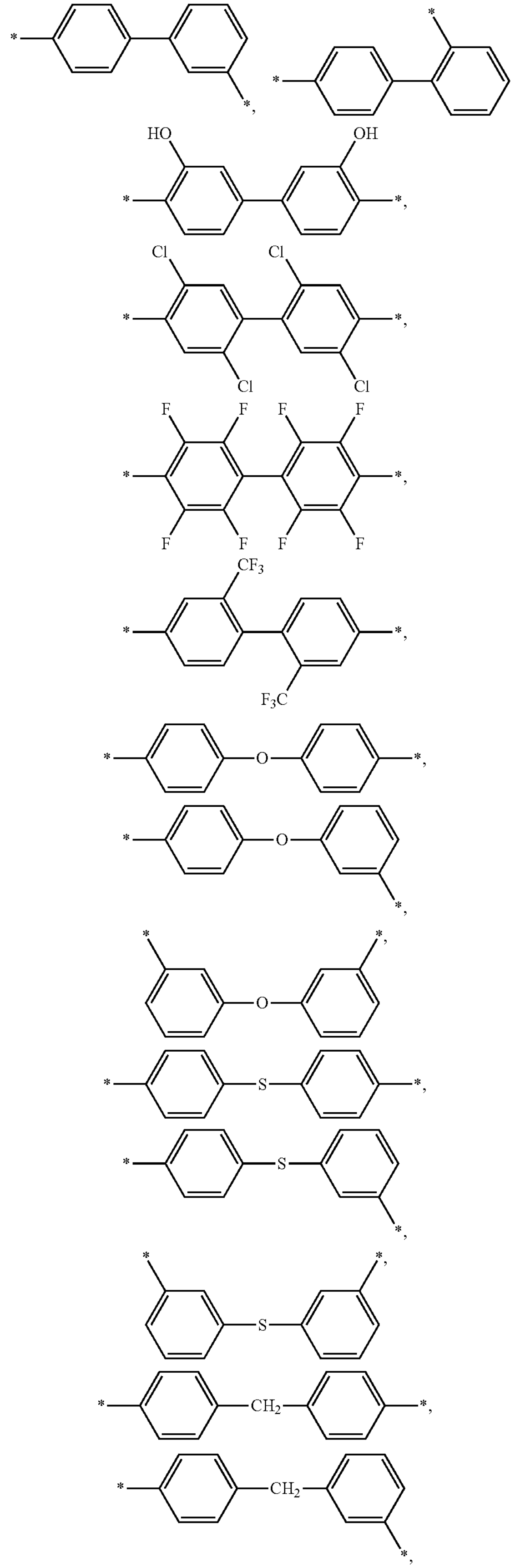

-continued
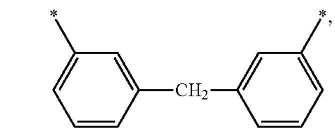
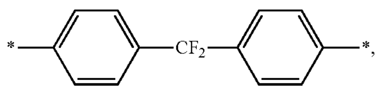
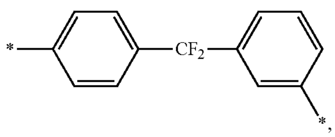
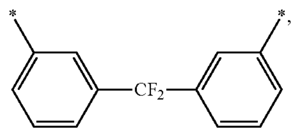
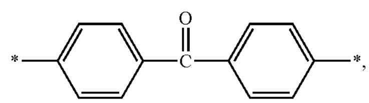
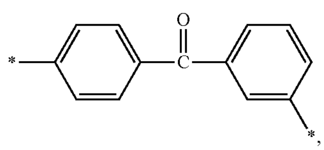
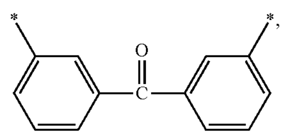
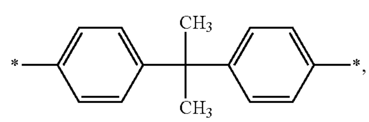
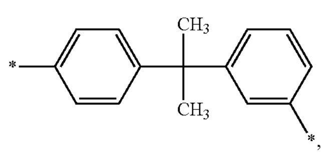
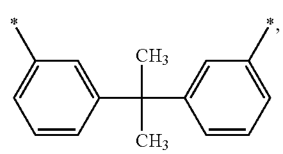
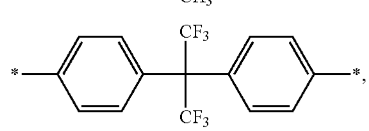
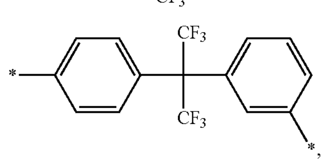
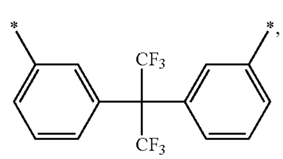
-continued
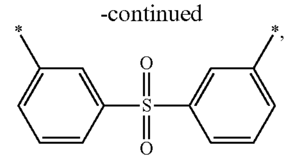
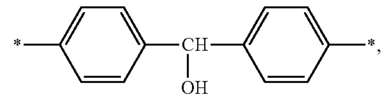
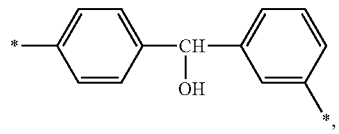
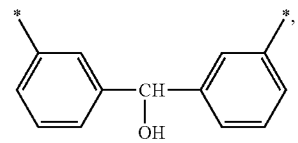
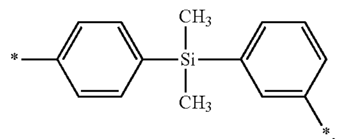
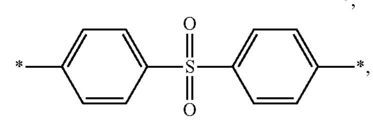
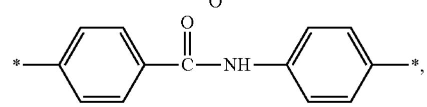
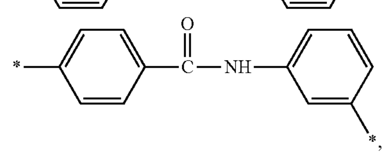
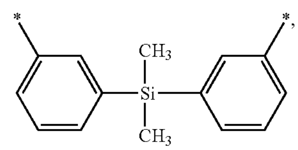
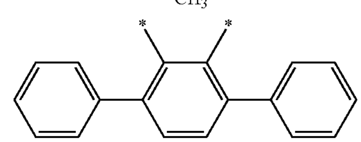
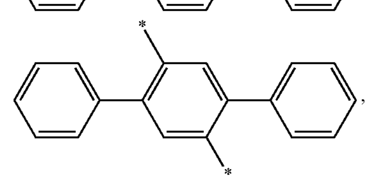
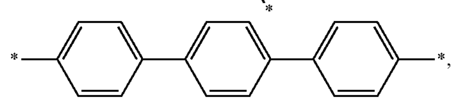
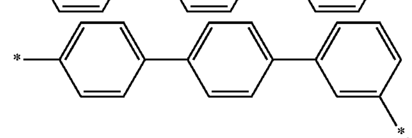
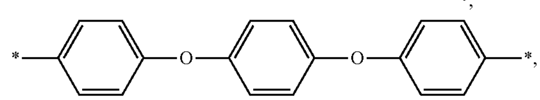

-continued

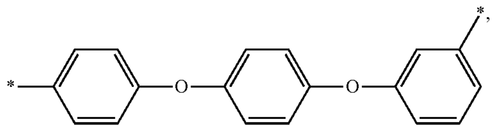

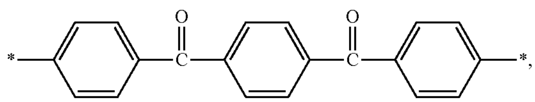

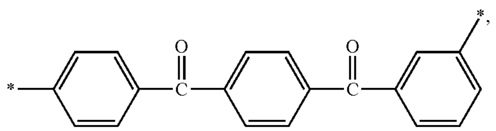

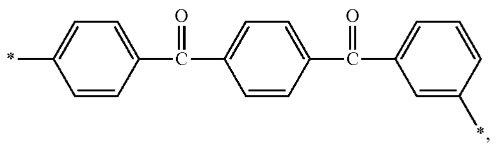

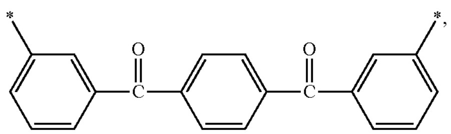

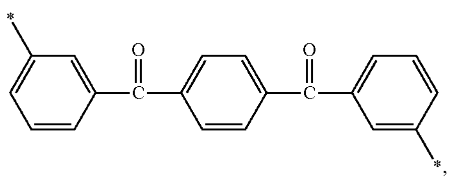

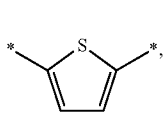

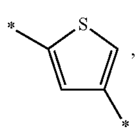

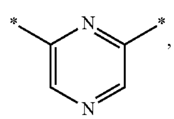

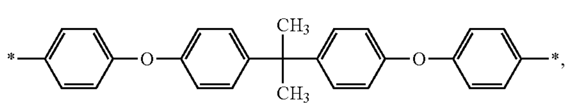

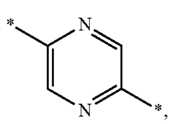

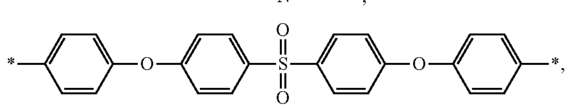

-continued

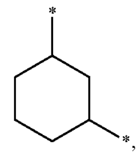

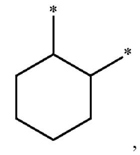

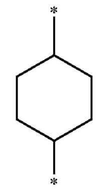

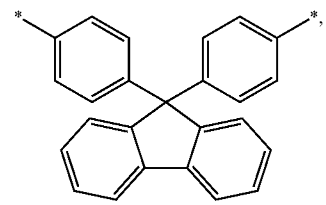

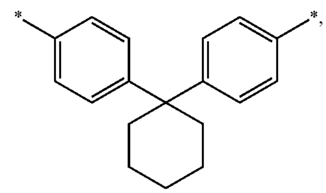

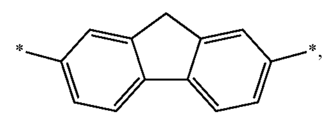

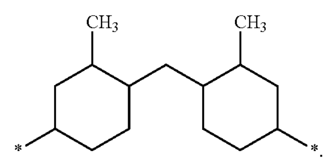

8. The copolymer of claim 1, wherein the repeating unit represented by Chemical Formula 1 comprises a repeating unit represented by Chemical Formulae 1-1 to 1-3, and 1-5, or a combination thereof; the repeating unit represented by Chemical Formula 2 comprises a repeating unit represented by Chemical Formulae 2-1 to 2-3, or a combination thereof; the repeating unit represented by Chemical Formula 3 comprises a repeating unit represented by Chemical Formulae 3-1 to 3-3, and 3-5, or a combination thereof; and the repeating unit represented by Chemical Formula 4 comprises a repeating unit represented by Chemical Formulae 4-1 to 4-3, and 4-5, or a combination thereof:

Chemical Formula 1-1

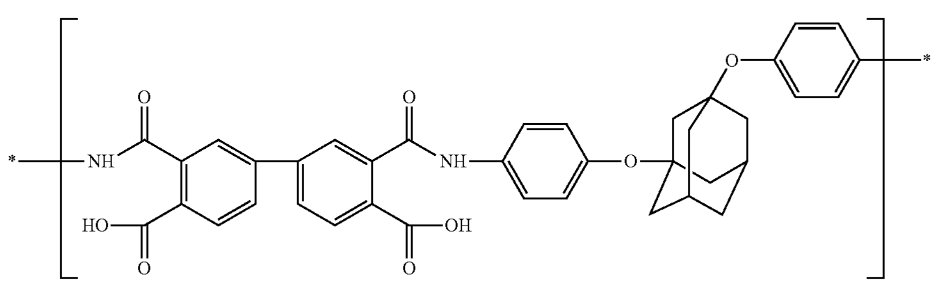

-continued
Chemical Formula 1-2
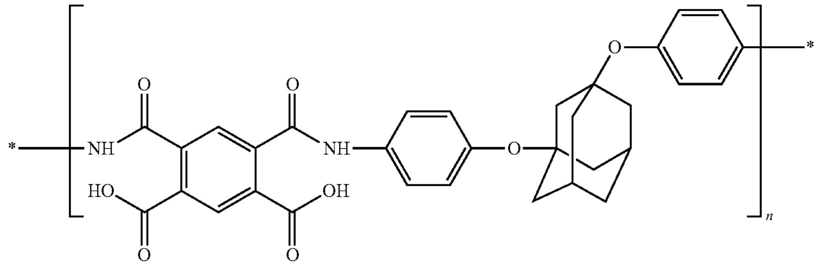
Chemical Formula 1-3
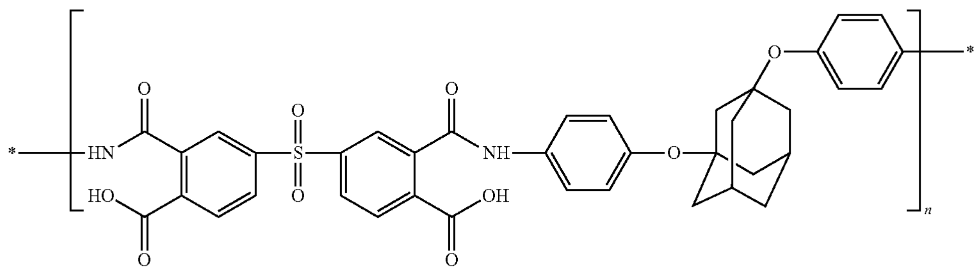
Chemical Formula 1-5
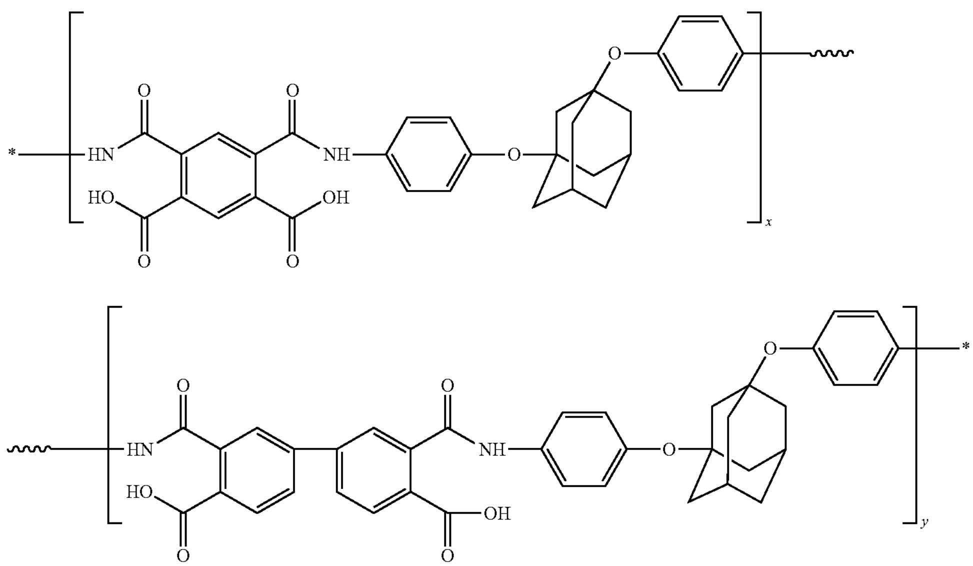
Chemical Formula 2-1
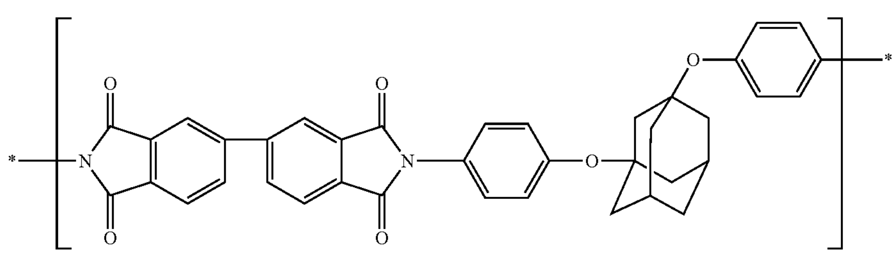
Chemical Formula 2-2
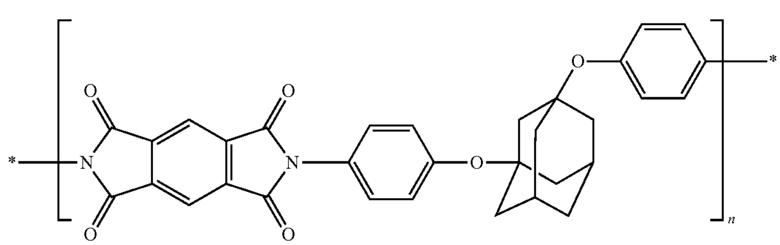

-continued
Chemical Formula 2-3
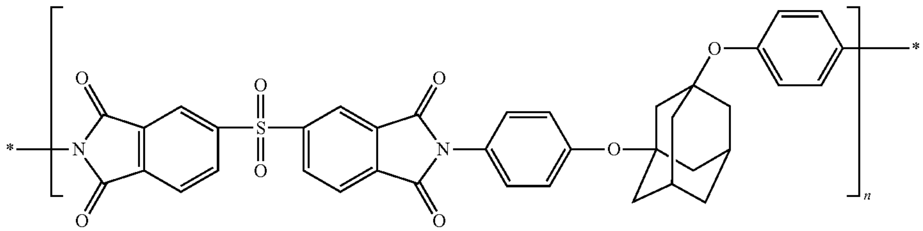
Chemical Formula 3-1
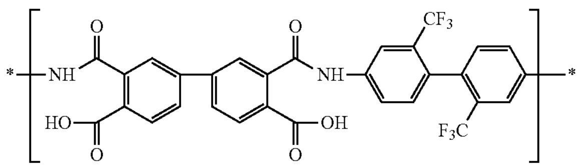
Chemical Formula 3-2
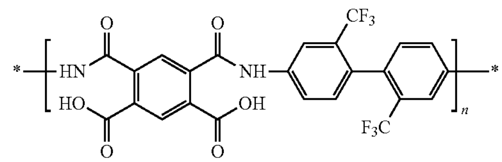
Chemical Formula 3-3
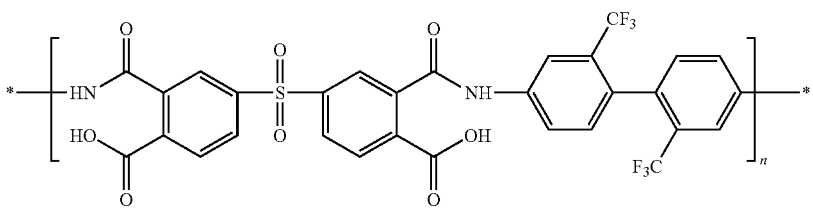
Chemical Formula 3-5
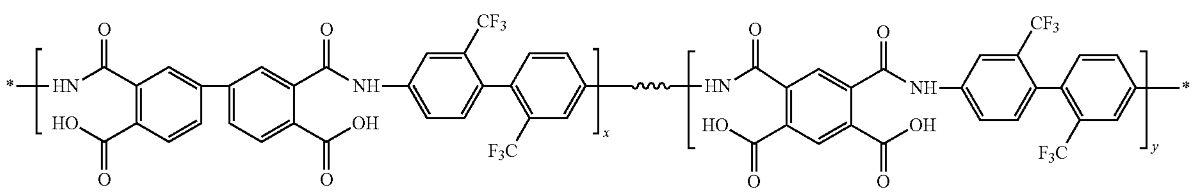
Chemical Formula 4-1
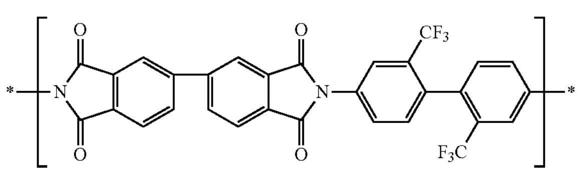
Chemical Formula 4-2
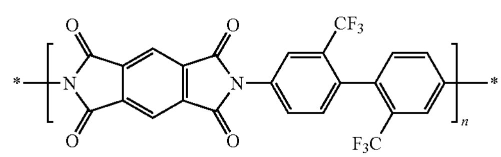
Chemical Formula 4-3
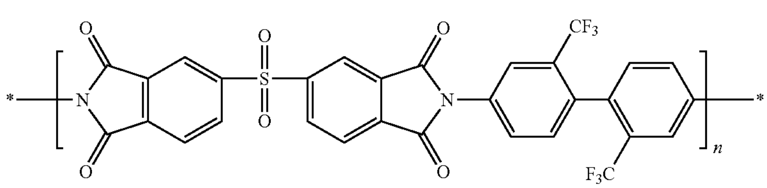
Chemical Formula 4-5
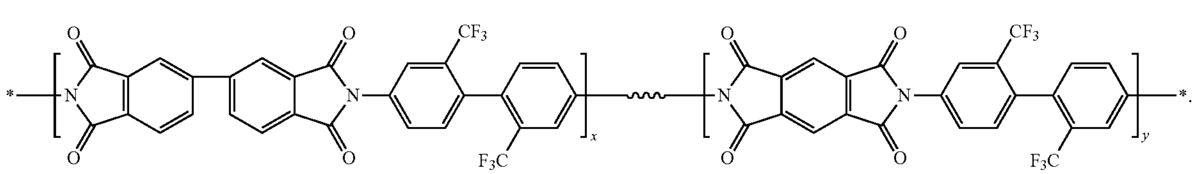

9. The copolymer of claim 1, wherein the copolymer has a weight average molecular weight of about 1,000 g/mol to about 500,000 g/mol.

10. The copolymer of claim 1, wherein the copolymer comprises the repeating unit A and the repeating unit B in a mole ratio of about 0.05 to 0.25:0.95 to 0.750.

11. The copolymer of claim 1, wherein the copolymer is cross-linked.

12. An article comprising the copolymer of claim 1.

13. The article of claim 12, wherein the article is a film, a fiber, or a coating material.

14. The article of claim 12, wherein the article has a thickness of about 0.1 micrometers to about 200 micrometers.

15. The article of claim 12, wherein the article has an average transmittance of greater than or equal to about 80% in a wavelength range of about 380 nanometers to about 800 nanometers.

16. The article of claim 12, wherein the article has a yellow index of less than or equal to about 5.

17. The article of claim 12, wherein the article has a coefficient of thermal expansion of less than or equal to about 50 parts per million/° C.

18. The article of claim 12, wherein the article has a weight loss ratio of less than or equal to about 1% at about 400° C.

19. A display device including the article of claim 12.

* * * * *